United States Patent [19]
Ogasawara

[11] Patent Number: 6,043,938
[45] Date of Patent: Mar. 28, 2000

[54] VARI-FOCAL LENS SYSTEM

[75] Inventor: Shuichiro Ogasawara, Hachioji, Japan

[73] Assignee: Olympus Optical Co., Ltd., Tokyo, Japan

[21] Appl. No.: 09/176,876

[22] Filed: Oct. 22, 1998

[30] Foreign Application Priority Data

Dec. 5, 1997 [JP] Japan .................................. 9-350145

[51] Int. Cl.[7] .............................. G02B 3/00; G02B 15/14
[52] U.S. Cl. ........................................... 359/652; 359/676
[58] Field of Search ............................ 359/652, 676–691

[56] References Cited

U.S. PATENT DOCUMENTS

| | | | |
|---|---|---|---|
| 4,976,521 | 12/1990 | Ishii et al. | 350/423 |
| 4,998,807 | 3/1991 | Uzawa et al. | 350/423 |
| 5,841,586 | 11/1998 | Nagoka | 359/654 |

FOREIGN PATENT DOCUMENTS

| | | |
|---|---|---|
| 2-56515 | 2/1990 | Japan . |
| 4-42113 | 2/1992 | Japan . |
| 6-337347 | 12/1994 | Japan . |
| 7-159694 | 6/1995 | Japan . |

*Primary Examiner*—Hung Xuan Dang
*Assistant Examiner*—Michael A Lucas
*Attorney, Agent, or Firm*—Pillsbury Madison & Sutro LLP

[57] ABSTRACT

A vari-focal lens system which comprises a plurality of lens units including a final lens unit having a positive refractive power, and uses at least a gradient index lens element which has a planar surface and another surface having curvature. This vari-focal lens system has a nearly telecentric composition, uses a small number of lens element in the final lens unit and is suited for use in electronic image pickup optical systems.

37 Claims, 8 Drawing Sheets

VARI-FOCAL LENS SYSTEM

BACKGROUND OF THE INVENTION a) Field of the Invention

The present invention relates to a vari-focal lens system to be used in optical instruments.

b) Description of the Prior Art

In recent years where optical instruments such as video cameras and digital cameras are prevailing, zoom lens systems which are capable of changing focal lengths are adopted for these instruments at an increasing ratio. However, a zoom lens system constitutes an obstacle to configuring of video cameras compactly and digital cameras and manufacturing these instruments at low costs since 10 or more lens elements are required to compose a zoom lens system which uses a large number of lens elements. Further, a zoom lens system for silver salt cameras also constitutes an obstacle to reducing manufacturing cost thereof since it requires 10 or more lens elements when it is composed of a large number of lens elements.

Further, it is desirable for a camera such as a video camera which uses an electronic image pickup device to dispose a nearly telecentric lens system on the image side. For this reason, it is desirable to configure a lens unit which is to be disposed on the image side as a lens unit having a positive refractive power and dispose an aperture stop on the object side of this lens unit. Generally disposed on the image side is a vari-focal lens unit which has a positive refractive power (hereinafter referred to as a final lens unit).

This final lens unit has an imaging function and a strong refractive power as a whole, and is ordinarily composed of a large number of lens elements, or three to six lens elements.

A zoom lens system of this type requires tedious procedures for working lens elements and a lens barrel and is highly sensible of eccentricities, thereby requiring a long time for assembly and adjustment, and making it difficult to lower a manufacturing cost thereof. Since this zoom lens system is composed of a large number of lens elements, it produces large amounts of rays reflected by surfaces, ghost rays and flare spots which are peculiar to a vari-focal lens system.

Since a number of lens elements used in this imaging lens unit (the final lens unit) can be reduced only within a certain limit so long as only homogeneous lens elements are adopted for the lens unit, aspherical lens elements and/or gradient index lens elements are used for reducing the number of lens elements in this lens unit.

Since a radial type gradient index lens element has a high aberration correcting capability in particular, it is possible to reduce the number of lens elements, configure the lens unit more compact and lower a manufacturing cost thereof.

As conventional examples of zoom lens systems which use radial type gradient index lens elements, there are known lens systems disclosed by Japanese Patents Kokai Publication No. Hei 4-42113, Kokai Publication No.

Hei 7-159694, Kokai Publication No. Hei 2-56515 and Kokai Publication No. Hei 6-337347.

Out of the these conventional examples, the lens system disclosed by Japanese Patent Kokai Publication No.

Hei 4-42113 uses an imaging lens unit (final lens unit) which is composed of two radial type gradient index lens elements.

Further, the lens system disclosed by Japanese Patent Kokai Publication No. Hei 7-159694 uses an imaging lens unit (final lens unit) which is composed of three lens elements: a radial type gradient index lens element and two homogeneous lens elements.

Furthermore, the lens system disclosed by Japanese Patent Kokai Publication No. Hei 2-56515 is composed of two radial type gradient index lens elements.

Moreover, the lens system disclosed by Japanese Patent Kokai Publication No. Hei 6-337347 is composed of three positive, negative and positive lens units and uses a gradient index lens element having a shape of a plane parallel plate in a final lens unit to correct chromatic aberration.

The lens system disclosed by Japanese Patent Kokai Publication No. Hei 4-42113 uses an imaging lens unit (final lens unit) which is composed of lens element in a number as small as two. This lens system is not preferable from viewpoints of workability and allowance since each of the two lens elements is a radial type gradient index lens element and has curvature on two surfaces thereof.

The lens system disclosed by Japanese Patent Kokai Publication No. Hei 7-159694 is not preferable from viewpoints of workability, allowance and manufacturing cost since the imaging lens unit (final lens unit) is composed of lens elements in a number as large as three, or two homogeneous lens elements and a radial type gradient index lens element, and the radial type gradient index lens element has curvature on two surfaces thereof.

Though the lens system disclosed by Japanese Patent Kokai Publication No. Hei 2-56515 is composed of a small number of lens elements, this lens system is not preferable from viewpoints of workability, allowance and a manufacturing cost since the lens system uses a plurality of radial type gradient index lens elements each of which has curvature on two surfaces thereof.

Though the lens system disclosed by Japanese Patent Kokai Publication No. Hei 6-337347 uses a gradient index lens element which has two planar surfaces, this lens system can hardly allow a manufacturing cost thereof to be reduced, and produces large amounts of rays reflected by surfaces, ghost rays and flare spots since the imaging lens unit (final lens unit) is composed of a large number of lens elements, and requires assembly and adjustment.

SUMMARY OF THE INVENTION

A primary object of the present invention is to provide a vari-focal lens system which is in a nearly telecentric condition, uses an image side imaging lens unit composed of an extremely small number of lens elements, simplifies assembly and working of lens elements and a lens barrel, has favorable optical performance and can be manufactured at a low cost.

The vari-focal lens system according to the present invention which has a first composition is characterized in that it is composed of a plurality of lens units including a final lens unit having a positive refractive power and that it comprises at least a gradient index lens element which has a planar surface and another surface having curvature.

The vari-focal lens system according to the present invention which has a second composition is composed of a plurality of lens units including a final lens unit comprising at least a gradient index lens element and an aperture stop disposed on the object side of the final lens unit, and is configured to change a magnification of the vari-focal lens system by varying an airspace reserved between the final lens unit and the aperture stop.

DETAILED DESCRIPTION OF THE PREFERRED EMBODIMENTS

Figure 1A:
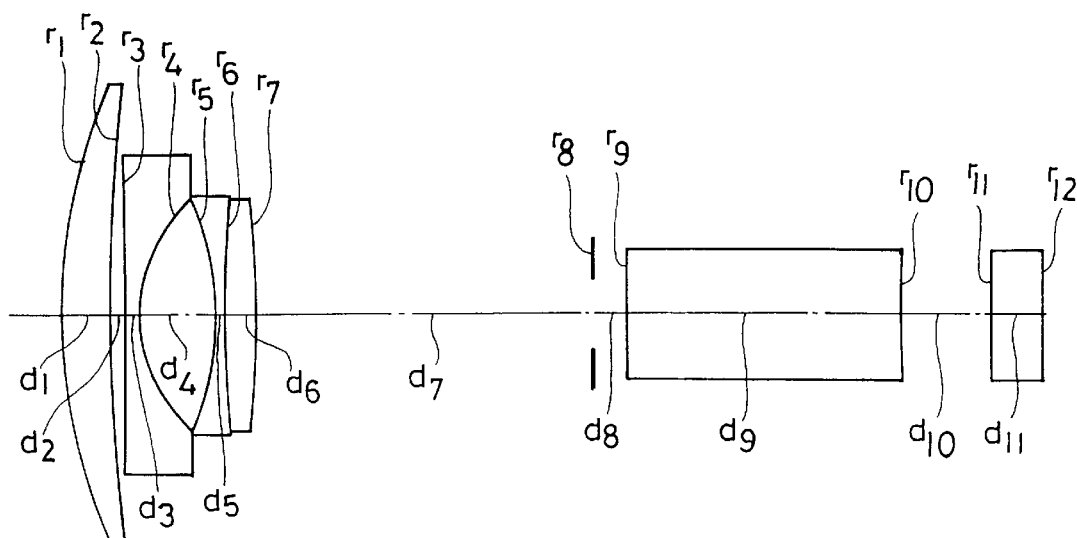
FIGS. 1A through 8C show sectional views illustrating compositions of first through eighth embodiments of the vari-focal lens system according to the present invention.

The vari-focal lens system according to the present invention which has a first composition is characterized in that it is composed of a plurality of lens units including a final lens unit having a positive refractive power, and that the lens system comprises at least a gradient index lens element which has a planar surface and another surface having curvature.

In order to obtain a zoom lens system which is in a condition as telecentric as possible and composed of a small number of lens elements, the inventor conceived a zoom type lens system which is composed of three lens units, for example, a first positive lens unit, a second negative lens unit and a third positive lens unit in order from the object side. A zoom lens system of this type has a merit that it can easily have a telecentric composition owing to the fact that it is composed of a small number of lens elements and a positive power is distributed on the image side.

The lens system which is composed of the three lens units is of a most fundamental type of zoom lens system, and changes it magnification from a wide position to a tele position by moving the lens units so as to widen an airspace reserved between the first lens unit and the second lens unit, and narrow an airspace reserved between the second lens unit and the third lens unit.

In this zoom lens system, the second lens unit mainly has a vari focal function and the third lens unit mainly has an imaging function. The zoom lens system of this type composed of the three lens units may be configured to move all three of the lens units or keep the first lens unit or the third lens unit stationary during a change of a magnification and move the other two lens units.

When the final lens unit is composed of a homogeneous spherical lens element in the zoom lens system which is composed of the first positive lens unit, the second negative lens unit and the third positive lens unit, coma and chromatic aberration are produced in large amounts, thereby making it difficult to maintain favorable imaging performance. Even when the third lens unit is composed of an aspherical lens element, the lens system cannot correct chromatic aberration though it corrects spherical aberration and coma to certain degrees.

Accordingly, the inventor conceived to compose the third lens unit of a radial type gradient index lens element.

A radial type gradient index lens element is made of a medium having a refractive index distribution n(r) in a direction perpendicular to an optical axis which is expressed by the following equation (a):

$$n(r)=N_0+N_1 r^2+N_2 r^4+N_3 r^6+ \quad (a)$$

wherein the reference symbol $N_0$ represents a refractive index on the optical axis at a standard wavelength (d-line), the reference symbol $N_i$ (i=1, 2, 3, . . . ) designates a coefficient expressing a refractive index distribution at the standard wavelength, and the reference symbol r denotes a distance as measured from the optical axis in the direction perpendicular to the optical axis.

Further, Abbe's numbers of a radial type gradient index lens element are given by the following equations (b) and (c):

$$V_0=(N_{0d}-1)(N_{0F}-N_{0C}) \quad (b)$$

$$V_i=N_{id}/(N_{iF}-N_{iC}) \; (i=1, 2, 3, \ldots) \quad (c)$$

wherein the reference symbols $N_{0d}$, $N_{0F}$, $N_{0C}$, $N_{id}$, $N_{iF}$ and $N_{iC}$ (i=1, 2, 3, . . . ) represent coefficients expressing a refractive index distribution at wavelength λ, i.e., a refractive index distribution for the d-line, F-line or C-line.

Further, a Petzval's sum PTZ and longitudinal chromatic aberration PAC to be produced by a radial type gradient index lens element are expressed by the following equations (d) and (e) respectively:

$$PTZ=(\phi_s/N_0)+(\phi_m/N_0^2) \quad (d)$$

$$PAC=K\{(\phi_s/V_0)+(\phi_m/V_1)\} \quad (e)$$

wherein the reference symbols $\phi_s$ and $\phi_m$ represent a refractive index of surface and a refractive index of medium respectively of the radial type gradient index lens element, and the reference symbol K designates a constant which is dependent on a height of ray and an angle of a final paraxial ray.

Furthermore, the refractive index of medium φm is approximated by the following equation (f):

$$\phi_m \fallingdotseq -2N_1 d \quad (f)$$

wherein the reference symbol d represents a thickness of the radial type gradient index lens element.

As is apparent from the equation (d) in which the denominator of the second term expressing a Petzval's sum to be produced by a medium is squared, it is possible to configure a radial type gradient index lens element so as to produce a Petzval's sum which is smaller than that to be produced by a homogeneous lens element having a refractive power which is the same as that of the radial type gradient index lens element. Further, it is possible to change a value of longitudinal chromatic aberration to be produced by a medium of a radial type gradient index lens element by changing a value of $V_1$ as seen from the equation (e).

In order to allow a radial type gradient index lens element to exhibit sufficient effects to correct a Petzval's sum and chromatic aberration, it is necessary to take into consideration balance between a refractive power of surface and a refractive power of medium of the radial type gradient index lens element. When a ratio $a=\phi_m/\phi$ ($\phi=\phi_s=\phi_m$) of a refractive power of medium relative to a refractive power of a lens system as a whole is defined, and relationship of the Petzval's sum PTZ and longitudinal chromatic aberration PAC versus the ratio a of the refractive power of medium is determined from the equations (d) and (e) in order to determine relationship among the refractive power of surface, the refractive power of medium and the Petzval's sum of the radial type gradient index lens element and longitudinal chromatic aberration, the Petzval's sum and longitudinal chromatic aberration is expressed by the following equations (d') and (e') respectively:

$$PTZ=\phi\{(1-N_0)a+N_0\}N_0^2 \quad (d')$$

$$PAC=K\phi\{(V_0-V_1)a+V_1\}/V_0 \cdot V_1 \quad (e')$$

From the equations (d') and (e'), it is necessary to set the ratio a of refractive power of medium so as to reduce the Petzval's sum PTZ and the longitudinal chromatic aberration. In other words, when a value of the ratio a of refractive power of medium at PTZ=0 is expressed as a(PTZ) and a value of the ratio a of refractive power of medium at PAC=0 is expressed as a(PAC), it is desirable that the ratio a of refractive power of medium has a value which is close to a(PTZ) and a(PAC).

Due to characteristics of a material for a radial type gradient index lens element, a(PTZ) and a(PAC) have values on the order of 0 to 6. It is therefore possible to favorably correct a Petzval's sum and longitudinal chromatic aberration with a single radial type gradient index lens element by setting the ratio a of refractive power of medium at an adequate value within a range from 0 to 6.

For the zoom lens system of this type, it is desirable to correct a Petzval's sum and longitudinal chromatic aberration produced by the lens units disposed on the object side of the third lens unit (final lens unit) with good balance in the lens system as a whole while suppressing production of aberrations in the third lens unit (final lens unit). For this purpose, it is desirable to configure a radial type gradient index lens element so as to have curvature.

When a radial type gradient index lens element is to have curvature on two surfaces, however, it is necessary to minimize eccentricities of the two curved surfaces from an axis of a refractive index distribution, thereby making it remarkably difficult to work the lens element and increasing its manufacturing cost or degrading optical performance due to manufacturing errors. When a gradient index lens element is configured so as to have two planar surfaces, in contrast, it facilitates working and provides a merit for lowering a manufacturing cost, but it lowers freedom for correction of aberrations, thereby making it impossible to correct aberrations sufficiently favorably and prolonging a total length of a lens system.

Out of two surfaces of a radial type gradient index lens element which is to be used in the vari-focal lens system according to the present invention, one whichever has a higher aberration correcting effect in the lens system is configured as a surface having curvature and the other is configured as a planar surface. In this case, adequate balance between a power of surface and a power of medium within a certain region from a viewpoint of correction of aberrations, and the power of surface has a value which is smaller than that of the power of medium within this region. Accordingly, curvature which is required for obtaining an adequate power of surface is relatively low. Therefore, it is possible to obtain, with a single surface having curvature, an aberration correcting effect which is similar to that of a gradient index lens which has two surfaces having curvature by configuring only one of two surfaces whichever has a higher aberration correcting effect as a surface having curvature and setting the curvature (a power of surface) at an adequate value.

When a gradient index lens element is configured to have curvature only on a surface thereof as described above, it is sufficient to prevent only the surface having the curvature from being eccentric from an axis of a refractive index distribution, whereby the gradient index lens element is remarkably enhanced in its work-ability and lowered in its manufacturing cost as compared with a gradient index lens element which has curvature on two surfaces. On the other hand, the gradient index lens element which has curvature on a surface thereof exhibits an aberration correcting effect which is similar to that of a gradient index lens element which has curvature on two surfaces, thereby being capable of lessening a burden on other lens elements without degrading workability of the lens system as a whole.

Though the foregoing description has been made of the zoom lens system which is composed of three lens units (positive, negative and positive), lens units, zoom lens systems of other types can also have compositions which are nearly telecentric when final lens units of the lens systems are configured to have positive refractive powers. It is possible to obtain a zoom lens system which can accomplish the object of the present invention since a Petzval's sum, chromatic aberration and other aberrations can be favorably corrected by using at least a radial type gradient index lens element in the lens system, and an aberration correcting capability nearly equivalent to that of a gradient index lens element which has curvature on two surfaces can be maintained while maintaining ease of in manufacturing and assembly of the gradient index lens element by configuring the radial type gradient index lens element so as to have a surface having curvature and a planar surface.

That is, the vari-focal lens system according to the present invention is characterized in that it has the composition described above.

In addition to the zoom lens system which is composed of the three (positie, negative and positive) lens units mentioned above as an illustrative example of a plurality of lens units which compose the vari-focal lens system according to the present invention, conceivable as a desirable composition of the vari-focal lens system according to the present invention is a zoom lens system which is composed of a first positive lens unit, a second negative lens unit and a third negative lens unit and a fourth positive lens unit or a zoom lens system which is composed of a first negative lens unit and a second positive lens unit.

For the reason described above, the vari-focal lens system according to the present invention which has the first composition is composed of a plurality of lens units including a final lens unit which has a positive refractive power, and comprises at least a gradient index lens element which has at least a planar surface and the other surface having curvature.

It is desirable that the gradient index lens element mentioned above is a radial type gradient index lens element and used in the final positive lens unit.

For correcting a Petzval's sum and longitudinal chromatic aberration more favorably in the vari-focal lens system according to the present invention which has the first composition, it is desirable that the radial type gradient index lens element satisfies the following condition (1):

$$0.5 < a < 2 \qquad (1)$$

wherein the reference symbol a represents a ratio of a refractive power of medium relative to a refractive power of the radial type gradient index lens element as a whole which is given by the following equation (g):

$$a = \phi_m / (\phi_s + \phi_m) \qquad (g)$$

wherein the reference symbols $\phi_s$ and $\phi_m$ represent a refractive power of surface and a refractive power of medium respectively of the radial type gradient index lens element.

If the ratio a of refractive power of medium has a value smaller than the lower limit of 0.5 of the condition (1), it will be impossible to favorably correct a Petzval's sum produced by the radial type gradient index lens element. If the upper limit of 2 of the condition (1), a Petzval's sum produced by the radial type gradient index lens element will be overcorrected.

Speaking from a viewpoint of manufacturing of a material for the gradient index lens element, there lies a limit to enlargement of a value of $N_1$ for obtaining a refractive power of medium $\phi_m$ which satisfies the condition (1). It is therefore desirable to satisfy the above-mentioned condition (1) by thickening a medium without enlarging a value of $N_1$.

For this purpose, it is desirable that the radial type gradient index lens element has a thickness d which satisfies the following condition (2):

$$0.05 < d/f_G < 5 \tag{2}$$

wherein the reference symbol $f_G$ represents a focal length of the radial type gradient index lens element.

When the radial type gradient index lens element has a thickness which satisfies the condition (2), it is possible to sufficiently strengthen a refractive power of medium as is apparent from the above-mentioned equation (f), thereby correcting a Petzval's sum and longitudinal chromatic aberration sufficiently favorably.

If the lower limit of 0.05 of the condition (2) is not satisfied, a refractive index difference (a difference between a refractive index on an optical axis and a refractive index at a marginal portion) which is required for a material will be large, thereby making it difficult to manufacture a material. If the upper limit of 5 of the condition (2) is exceeded, in contrast, the gradient index lens element will have a large total length, thereby prolonging a total length of the lens system as a whole.

In order to obtain favorable optical performance with a single radial type gradient index lens element, it is important to impart a power to the lens element so that it produces aberrations in amounts as small as possible and it is desirable for this purpose to configure the lens element so as to satisfy the following conditions (3) and (4):

$$-0.2 < N_2 \cdot ER^2/N_1 < 0.2 \tag{3}$$

$$V_0 < V_1 \tag{4}$$

wherein the reference symbol $N_1$ and $N_2$ represent distribution coefficients of the second order and the fourth order respectively of the radial type gradient index lens element, the reference symbol ER designates an effective diameter of the radial type gradient index lens element, and the reference symbols $V_0$ and $V_1$ denote Abbe's numbers of the radial type gradient index lens element which are given by the above-mentioned equations (b) and (c) respectively.

The condition (3) is adopted for favorably reducing an amount of spherical aberration to be produced by a medium of the radial type gradient index lens element. If the lower limit of −0.2 of the condition (3) is not satisfied, spherical aberration will be remarkably undercorrected. If the upper limit of 0.2 of the condition (3) is exceeded, in contrast, spherical aberration will be remarkably overcorrected.

The condition (4) is adopted for maintaining chromatic aberration at a favorable level by reducing an amount of chromatic aberration to be produced by a medium of the radial type gradient index lens element. If the condition (4) is not satisfied, chromatic aberration will be too remarkable.

For the vari-focal lens system according to the present invention, it is desirable to dispose an aperture stop in the vicinity of an object side surface of the radial type gradient index lens element disposed in the third lens unit (final lens unit) so that the lens system will produce astigmatism in an amount as small as possible and have a diameter which is not so large.

It is desirable that a location of the aperture stop satisfies the following condition (5):

$$0 < D/f_R < 0.5 \tag{5}$$

wherein the reference symbol D represents a distance as measured in a direction along the optical axis from the aperture stop to the object side surface of the radial type gradient index lens element and the reference symbol $f_R$ designates a focal length of the final lens unit.

The condition (5) defines a location of the aperture stop. When the aperture stop is disposed as a location within a range defined by the condition (5), it is possible to favorably correct astigmatism.

If the lower limit of 0 of the condition (5) is not satisfied or if the upper limit of the condition (5) is exceeded, a meridional image surface will be remarkably tilted in the negative direction or in the positive direction, thereby aggravating astigmatism.

From viewpoints of an optical effect and ease of manufacture of a material, it is desirable that the radial type gradient index lens element has a maximum refractive index difference $\Delta n$ which satisfies the following condition (6):

$$0.01 < \Delta n < 0.2 \tag{6}$$

If the lower limit of 0.01 of the condition (6) is not satisfied, the radial type gradient index lens element has a degraded function. If the upper limit of 0.2 of the condition (6) is exceeded, in contrast, it will be difficult to manufacture a material.

The curved surface to be disposed as at least one of surfaces of the gradient index lens element to be used in the lens system according to the present invention may be adequately configured dependently on a composition of the lens system so as to satisfy the conditions mentioned above, convex or concave and used as an object side or image side surface. When the curved surface is concave it facilitates correction a Petzval's sum and axial aberrations or when the curved surface is convex, it exhibits an effect to facilitate to widening a field angle of the lens system by thinning lens elements and widening a field angle of the final lens unit.

In order to correct a Petzval's sum more favorably by using a radial type gradient index lens element in the vari-focal lens system according to the present invention, it is desirable to satisfy, in place of the condition (1), the following condition (1-1) or (1-2):

$$0.5 < a < 0.97 \tag{1-1}$$

$$1.03 < a < 2 \tag{1-2}$$

If the lower limit of 0.5 of the condition (1-1) is not satisfied, a Petzval's sum will be large or if the upper limit of 2 of the condition (1-2) is exceeded, a Petzval's sum will be produced in the reverse direction.

When a has a value of 1, a power of surface will be zeroed, or the radial type gradient index lens element will have two planar surfaces. If the upper limit of the condition (1-1) or the lower limit of the condition (1-2) is not satisfied, curvature will be too low, thereby undesirably lowering the effect to correct aberrations.

It is more desirable for correction of a Petzval's sum to satisfy, in place of the condition (1), (1-1) or (1-2), the following condition (1-3) or (1-4):

$$0.5 < a < 0.95 \tag{1-3}$$

$$1.05 < a < 2 \tag{1-4}$$

Further, it is desirable that the vari-focal lens system according to the present invention satisfies, in place of the condition (3) and the condition (4), the following conditions (3-1) and (8) respectively.

$$-0.05 < N_2 \cdot ER^2/N_1 < 0.05 \qquad (3\text{-}1)$$

$$-0.01 < 1/V_1 < 0.02 \qquad (8)$$

The condition (3-1) is required for favorably correcting spherical aberration to be produced by a medium of the radial type gradient index lens element. Spherical aberration can be corrected more favorably when the condition (3-1) is satisfied. If the lower limit of the condition (3-1) is not satisfied, spherical aberration will be undercorrected. If the upper limit of the condition (3-1) is not satisfied, in contrast, spherical aberration will be overcorrected.

The condition (8) is required for more favorably correcting chromatic aberration to be produced by the medium of the radial type gradient index lens element. If the upper limit of the condition (8) is exceeded, chromatic aberration will be aggravated. If the lower limit of the condition (8) is not satisfied, chromatic aberration will be aggravated in a reverse direction.

The composition of the zoom lens system taken as the example described above which consists of a first lens unit composed of a homogeneous lens element, a second lens unit composed of a homogeneous lens element and the third lens unit composed of a radial type gradient index lens element has a merit also from a viewpoint to manufacture the lens elements.

In the composition of the zoom lens system which consists of the first positive lens unit, the second negative lens unit and the third positive lens unit, the first lens unit and the second lens unit tend to have diameters which are larger than that of the third lens unit. From a viewpoint of manufacturing of lens elements, on the other hand, a smaller radial type gradient index lens element can be manufactured easier since it is manufactured by the ion exchange method and it is rather hard to work or polish ordinary lens elements which are extremely small. It is therefore advantageous from the viewpoint of manufacturing of lens elements to use homogeneous lens elements as the first lens unit and the second lens unit which have relatively large diameters, and adopt a radial type gradient index lens element as the third lens unit which has a relatively small diameter. The composition described above allows one to use a radial type gradient index lens element having a positive power which can easily be manufactured.

For the reason described above, it is desirable to compose the final lens unit of the lens system according to the present invention of a radial type gradient index lens element which has curvature only on one surface. This radial type gradient index lens element permits reducing a number of lens elements to be used in the lens system, reduces procedures to work a lens barrel, and eliminates the necessity of assembly and adjustment, thereby making it possible to manufacture a vari-focal lens system at a low cost.

The effect described above is obtainable not only for a zoom lens system which is composed of three lens units but also for a vari-focal lens system which is composed of a plurality of lens units including a final lens unit which has a positive refractive power.

That is, the lens system according in the present invention is characterized in that it is composed of a plurality of lens units including a final lens unit which has a positive refractive power, and that it comprises a radial type gradient index lens element which has at least a planar surface and the other surface having curvature.

Though the lens system according to the present invention which uses a final lens unit composed of a gradient index lens element can sufficiently accomplish the object of the present invention, it is possible to correct aberrations more favorably by adopting a composition wherein a lens element is added to the gradient index lens element in the final lens unit.

Now, description will be made of the vari-focal lens system according to the present invention which has a second composition.

The vari-focal lens system according to the present invention which has the second composition is characterized in that it is composed of a plurality of lens units, that it comprises at least a gradient index lens element in a final lens unit and that an airspace reserved between the final lens unit and an aperture stop is varied as the lens system changes its magnification.

Though it is desirable for a vari-focal lens system to correct aberrations favorably over entire vari-focal range, a variation of astigmatism to be caused by a change of a magnification can hardly be suppressed to a low level. The vari-focal lens system according to the present invention has the second composition described above which reduces a variation of astigmatism. Speaking concretely, an aperture stop is disposed on the object side of the final lens unit, and an airspace reserved between the final lens unit and the aperture stop is varied for changing a magnification.

In this case, a maximum variation amount AD of the airspace reserved between the aperture stop and the final lens unit to be caused by moving the final lens unit for the change of a magnification is within a range defined by the following condition (7):

$$1 |\Delta D/f_w| < 0.9 \qquad (7)$$

wherein the reference symbol $f_w$ represents a focal length of the vari-focal lens system as a whole at the wide position.

If the range defined by the condition (7) is exceeded, a gradient index lens element generally produces astigmatism in a large amount dependently on positional relationship between the gradient index lens element and an aperture stop. Accordingly, astigmatism can be corrected favorably by disposing an aperture stop within an adequate range in the vicinity of a gradient index lens element. The condition (7) defines an adequate range for a location of an aperture stop (an adequate range of a spacing between an aperture stop and a gradient index lens element). If the range defined by the condition (7) is exceeded, a meridional image surface will be remarkably tilted, thereby aggravating astigmatism.

The fact that astigmatism is varied by changing a spacing between an aperture stop and a gradient index lens element means a fact that optional astigmatism can be produced by changing the spacing. This effect is valid whether or not a final lens unit has a positive or negative refractive power.

In the vari-focal lens system according to the present invention which has the second composition, it is possible to reduce aberrations to be produced by the final lens unit and cancel astigmatism produced by the lens units disposed on the object side of the final lens unit with astigmatism produced by moving the gradient index lens element disposed in the final lens unit relative to the aperture stop. Accordingly, it is possible to correct astigmatism favorably in the lens system as a whole.

By configuring the lens system so as to correct astigmatism favorably in the lens system as a whole as described above, it is possible to correct aberrations in the lens system as a whole even when the lens units disposed on the object side of the final lens unit produce astigmatism in an amount which is large to a certain degree, thereby allowing the lens units disposed on the object side of the final lens unit cause a larger variation of astigmatism and enlarge freedom to correct other aberrations. As a result, it is possible to further enhance optical performance of the lens system and lessen burdens imposed on each lens element to correct aberrations, thereby allowing the lens element to have a shape which can easily be worked and obtaining a merit to lower a manufacturing cost.

Further the final lens unit which ordinarily requires three to six lens elements can be composed of a single gradient index lens element. In this case, it is allowed to expect to reduce a manufacturing cost by simplifying a structure of a lens barrel and causes for eccentricities are remarkably reduced by composing the final lens unit of a single gradient index lens element, thereby preventing performance from being degraded due to variations, etc.

From the viewpoint of correction of aberrations, it is desirable, as described above, to configure the gradient index lens element so as to have curvature or more desirable to configure the gradient index lens element so as to have curvature on one of two surfaces whichever has a higher aberration correcting effect in a lens system to which the lens element is to be applied. When the gradient index lens element is configured as described above, it is sufficient at a working stage to prevent only the surface having curvature from being eccentric from an optical axis of a refractive index distribution, and the gradient index lens element which has curvature only on one surface has workability higher than that of a gradient index lens element which has curvature on two surfaces and can be manufactured at a cost which is not so much higher than that of a gradient index lens element which has two planar surfaces. In contrast, the gradient index lens element which has curvature on one surface exhibits an aberration correcting effect which is nearly equal to that of the gradient index lens element which has curvature on two surfaces and can lessen the burdens on other lens elements, thereby providing extremely remarkable effects without degrading workability of the lens system as a whole.

It is desirable that the lens system according to the present invention which has the second composition also satisfies the above mentioned condition (1).

Further, it is desirable to configure the lens system which has the second composition so as to satisfy the condition (2) or more desirable so as to satisfy both the conditions (1) and (2).

Furthermore, it is desirable to configure the lens system which has the second composition so as to satisfy the conditions (3) and (4), the conditions (1), (3) and (4), the conditions (2), (3) and (4) or all the conditions (1), (2), (3) and (4).

Moreover, it is desirable to configure the lens system which has the second composition so as to satisfy any of the conditions (1-2), the condition (1-3) and the condition (1-4), in place of the condition (1). Further, it is desirable that the lens system satisfy the conditions (3-1) and the condition (8) in place of the conditions (3) and (4).

In addition, it is desirable that the lens system which has the second composition satisfies either or both of the conditions (5) and (6).

Now, the preferred embodiments of the vari-focal lens system according to the present invention will be described in a form of numerical data:

---

Embodiment 1

$f = 5.18 \sim 14.34$, $F/2.8$, $2\omega = 76.5° \sim 25.6°$,
maximum image height = 3.06, $f_B = 7.19$ $r_1 = 34.3456$
 $d_1 = 2.7602$   $n_1 = 1.6516$   $\nu_1 = 58.55$
$r_2 = 142.0836$ (aspherical surface)
 $d_2 = D_1$ (variable)
$r_3 = -504.9004$
 $d_3 = 0.8358$   $n_2 = 1.48749$   $\nu_2 = 70.23$
$r_4 = 9$
 $d_4 = 4.4$
$r_5 = -16.2652$
 $d_5 = 0.5$   $n_3 = 1.48749$   $\nu_3 = 70.23$
$r_6 = 79.3856$
 $d_6 = 1.85$   $n_4 = 1.90135$   $\nu_4 = 31.55$
$r_7 = -59.2724$
 $d_7 = D_2$ (variable)
$r_8 = \infty$(stop)
 $d_8 = D_3$ (variable)
$r_9 = \infty$
 $d_9 = 15.6874$   $n_5$ (gradient index lens)
$r_{10} = 117.4158$
 $d_{10} = D_4$ (variable)
$r_{11} = \infty$
 $d_{11} = 3$   $n_6 = 1.51633$   $\nu_6 = 64.14$
$r_{12} = \infty$

|     | wide    | intermediate focal length | tele    |
|-----|---------|---------------------------|---------|
| $D_1$ | 0.8     | 9.1718                    | 19.4101 |
| $D_2$ | 19.1921 | 10.8203                   | 0.582   |
| $D_3$ | 1.9033  | 1.3162                    | 0.1     |
| $D_4$ | 5.2094  | 5.7965                    | 7.012   |

| | radial gradient index lens | |
|---|---|---|
| i | Ni | Vi |
| 0 | 1.65 | 40 |
| 1 | $-3.96 \times 10^{-3}$ | $6.50 \times 10^2$ |
| 2 | 0 | 0 | aspherical surface coefficients $P = 1.989$, $E = 3.52 \times 10^{-6}$, $F = 2.46 \times 10^{-9}$
$\phi = \phi_m/(\phi_s + \phi_m) = 1.057471$, $\phi_m = 0.1012$, $\phi_s = -0.0055$
$\Delta n = -0.057$, $\Delta D/f_W = 0.347958$, $N_2 \cdot ER^2/N_1 = 0$
$D/f_R$ (max) = 0.187689, $f_R = 10.1407$
$d/F_G = 1.546974$, $F_G = 10.1407$

---

Embodiment 2

$f = 5.19 \sim 16.1$, $F/2.77$, $2\omega = 64.2° \sim 22.9°$,
maximum image height = 3.06, $f_B = 5.81$ $r_1 = 39.3861$
 $d_1 = 1.2$   $n_1 = 1.78472$   $\nu_1 = 25.68$
$r_2 = 26.0117$
 $d_2 = 8.0215$   $n_2 = 1.60311$   $\nu_2 = 60.64$
$r_3 = 275.8173$
 $d_3 = 0.15$
$r_4 = 20.3717$
 $d_4 = 4.0235$   $n_3 = 1.58313$   $\nu_3 = 59.38$
$r_5 = 37.5401$
 $d_5 = D_1$ (variable)
$r_6 = 33.1926$
 $d_6 = 0.9$   $n_4 = 1.72916$   $\nu_4 = 54.68$
$r_7 = 7.936$
 $d_7 = 5.9863$
$r_8 = -26.615$
 $d_8 = 0.9$   $n_5 = 1.6228$   $\nu_5 = 57.05$
$r_9 = 12.7367$
 $d_9 = 3.3575$   $n_6 = 1.84666$   $\nu_6 = 23.78$
$r_{10} = 58.1261$ -continued $d_{10} = D_2$ (variable)
$r_{11} = \infty$ (stop)
$d_{11} = D_3$ (variable)
$r_{12} = 43.7702$
$d_{12} = 17.6997$        $n_7$ (gradient index lens)
$r_{13} = \infty$
$d_{13} = D_4$ (variable)
$r_{14} = \infty$
$d_{14} = 3.6832$        $n_8 = 1.51633$        $\nu_8 = 64.14$
$r_{15} = \infty$

|  | wide | intermediate focal length | tele |
|---|---|---|---|
| $D_1$ | 0.338 | 6.9875 | 13.3844 |
| $D_2$ | 18.6459 | 11.9969 | 5.5999 |
| $D_3$ | 2.4831 | 2.0913 | 1.9841 |
| $D_4$ | 3.3816 | 3.7727 | 3.8573 |

| radial gradient index lens | | |
|---|---|---|
| i | $N_i$ | $V_i$ |
| 0 | 1.664 | 38.2 |
| 1 | $-3.27 \times 10^{-3}$ | $6.55 \times 10^2$ |
| 2 | 0 | $6.55 \times 10^2$ |

$\phi = \phi_m/(\phi_s + \phi_m) = 0.859908$, $\phi_m = 0.0933$, $\phi_s = 0.0152$
$\Delta n = -0.0447$, $\Delta D/f_W = 0.096225$, $N_2 \cdot ER^2/N_1 = 0$
$D/f_R$ (max) $= 0.248491$, $f_R = 9.9927$
$d/F_G = 1.771263$, $F_G = 9.9927$ Embodiment 3

$f = 4.99 \sim 15.0$, $F/2.69$, $2\omega = 61.5° \sim 21.8°$,
maximum image height $= 3.06$, $f_B = 4.86$
$r_1 = 58.1799$
$d_1 = 1.2$        $n_1 = 1.78472$        $\nu_1 = 25.68$
$r_2 = 35$
$d_2 = 9.5$        $n_2 = 1.60311$        $\nu_2 = 60.64$
$r_3 = -232.1086$
$d_3 = 0.15$
$r_4 = 23.9063$
$d_4 = 5.5088$        $n_3 = 1.62299$        $\nu_3 = 58.16$
$r_5 = 53.4467$
$d_5 = D_1$ (variable)
$r_6 = 53.9072$
$d_6 = 0.9$        $n_4 = 1.72916$        $\nu_4 = 54.68$
$r_7 = 7.8186$
$d_7 = 5.9957$
$r_8 = -17.4898$
$d_8 = 0.9$        $n_5 = 1.6228$        $\nu_5 = 57.05$
$r_9 = 23.1558$
$d_9 = 3.7305$        $n_6 = 1.84666$        $\nu_6 = 23.78$
$r_{10} = -60.3016$
$d_{10} = D_2$ (variable)
$r_{11} = 504.4068$
$d_{11} = 2.0389$        $n_7 = 1.51633$        $\nu_7 = 64.14$
$r_{12} = -94.792$
$d_{12} = 1$
$r_{13} = \infty$ (stop)
$d_{13} = D_3$ (variable)
$r_{14} = 61.8808$
$d_{14} = 18.6133$        $n_8$ (gradient index lens)
$r_{15} = \infty$
$d_{15} = D_4$ (variable)
$r_{16} = \infty$
$d_{16} = 3.6832$        $n_9 = 1.51633$        $\nu_9 = 64.14$
$r_{17} = \infty$

|  | wide | intermediate focal length | tele |
|---|---|---|---|
| $D_1$ | 0.3535 | 7.5689 | 13.1152 |
| $D_2$ | 16.3842 | 9.1681 | 3.6225 |
| $D_3$ | 2.8787 | 2.343 | 1.7486 |
| $D_4$ | 2.4289 | 2.9645 | 3.5611 |

| radial gradient index lens | | |
|---|---|---|
| i | $N_i$ | $V_i$ |
| 0 | 1.664 | 38.2 |
| 1 | $-3.27 \times 10^{-3}$ | $6.55 \times 10^2$ |
| 2 | 0 | $6.55 \times 10^2$ |

$\phi = \phi_m/(\phi_s + \phi_m) = 0.899531$, $\phi_m = 0.0958$, $\phi_s = 0.0107$
$\Delta n = -0.0447$, $\Delta D/f_W = 0.226361$, $N_2 \cdot ER^2/N_1 = 0$
$D/f_R$ (max) $= 0.287991$, $f_R = 9.9958$
$d/F_G = 1.862112$, $F_G = 9.9958$ Embodiment 4

$f = 3.99 \sim 7.60$, $F/2.83$, $2\omega = 63.7° \sim 30.6°$,
maximum image height $= 2.00$, $f_B = 6.08$
$r_1 = -12.6469$
$d_1 = 0.6$        $n_1 = 1.51633$        $\nu_1 = 64.14$
$r_2 = 8.8515$
$d_2 = D_1$ (variable)
$r_3 = \infty$ (stop)
$d_3 = D_2$ (variable)
$r_4 = \infty$
$d_4 = 9.2151$        $n_2$ (gradient index lens)
$r_5 = -27.9113$
$d_5 = D_3$ (variable)
$r_6 = \infty$
$d_6 = 2$        $n_3 = 1.51633$        $\nu_3 = 64.14$
$r_7 = \infty$

|  | wide | intermediate focal length | tele |
|---|---|---|---|
| $D_1$ | 8.1858 | 3.3781 | 1 |
| $D_2$ | 0.298 | 1.2182 | 0 |
| $D_3$ | 4.7619 | 5.5867 | 7.0375 |

| radial gradient index lens | | |
|---|---|---|
| i | $N_i$ | $V_i$ |
| 0 | 1.664 | 38.2 |
| 1 | $-9.26 \times 10^{-3}$ | $6.55 \times 10^2$ |
| 2 | 0 | 0 |

$\phi = \phi_m/(\phi + \phi_m) = 0.859005$, $\phi_m = 0.145$, $\phi_s = 0.0238$
$\Delta n = -0.03$, $\Delta D/f_W = 0.074599$, $N_2 \cdot ER^2/N_1 = 0$
$D/f_R$ (max) $= 0.192997$, $f_R = 6.312$
$d/F_G = 1.459933$, $F_G = 6.312$ Embodiment 5

$f = 5.00 \sim 15.0$ $F/2.61$, $2\omega = 57.1° \sim 19.8°$,
maximum image height $= 2.754$, $f_B = 7.06$
$r_1 = 66.5688$
$d_1 = 1.2$        $n_1 = 1.78472$        $\nu_1 = 25.68$
$r_2 = 40$
$d_2 = 10$        $n_2 = 1.60311$        $\nu_2 = 60.64$
$r_3 = -154.5462$
$d_3 = 0.15$
$r_4 = 23.2436$
$d_4 = 5.6276$        $n_3 = 1.62299$        $\nu_3 = 58.16$
$r_5 = 48.8424$
$d_5 = D_1$ (variable)
$r_6 = 55.0631$
$d_6 = 0.9$        $n_4 = 1.72916$        $\nu_4 = 54.68$
$r_7 = 9.0395$
$d_7 = 5.9957$
$r_8 = -15.8491$
$d_8 = 0.9$        $n_5 = 1.6228$        $\nu_5 = 57.05$
$r_9 = 29.186$ -continued

| | | |
|---|---|---|
| $d_9 = 3.731$ | $n_6 = 1.8466$ | $\nu_6 = 23.78$ |
| $r_{10} = -47.8713$ | | |
| $d_{10} = D_2$ (variable) | | |
| $r_{11} = -25.1706$ | | |
| $d_{11} = 2.0582$ | $n_7 = 1.51633$ | $\nu_7 = 64.14$ |
| $r_{12} = -100$ | | |
| $d_{12} = 1$ | | |
| $r_{13} = \infty$ (stop) | | |
| $d_{13} = D_3$ (variable) | | |
| $r_{14} = \infty$ | | |
| $d_{14} = 18.5666$ | $n_8$ (gradient index lens) | |
| $r_{15} = -32.4048$ | | |
| $d_{15} = D_4$ (variable) | | |
| $r_{16} = \infty$ | | |
| $d_{16} = 3.6832$ | $n_9 = 1.51633$ | $\nu_9 = 64.14$ |
| $r_{17} = \infty$ | | |

| | wide | intermediate focal length | tele |
|---|---|---|---|
| $D_1$ | 0.371 | 7.544 | 13.0713 |
| $D_2$ | 16.3175 | 9.186 | 4.1491 |
| $D_3$ | 2.8426 | 2.3851 | 1.7486 |
| $D_4$ | 4.6281 | 5.0124 | 5.4067 |

| | radial gradient index lens | |
|---|---|---|
| i | Ni | Vi |
| 0 | 1.664 | 38.2 |
| 1 | $-3.27 \times 10^{-3}$ | $6.55 \times 10^2$ |
| 2 | 0 | $6.55 \times 10^2$ |

$\phi = \phi_m/(\phi_s + \phi_m) = 0.82358, \phi_m = 0.0957, \phi_s = 0.0205$
$\Delta n = -0.04, \Delta D/f_W = 0.218901, N_2 \cdot ER^2/N_1 = 0$
$D/f_R$ (max) $= 0.29512, f_R = 9.632$
$d/F_G = 1.927596, F_G = 9.632$ Embodiment 6

$f = 6.45 \sim 15.0$ F/3.10, $2\omega = 47.8° \sim 19.3°$,
maximum image height $= 2.754, f_B = 8.29$

| | | |
|---|---|---|
| $r_1 = 95.3923$ | | |
| $d_1 = 1.2$ | $n_1 = 1.78472$ | $\nu_1 = 25.68$ |
| $r_2 = 40$ | | |
| $d_2 = 10$ | $n_2 = 1.60311$ | $\nu_2 = 60.64$ |
| $r_3 = -100.9808$ | | |
| $d_3 = 0.15$ | | |
| $r_4 = 30.7373$ | | |
| $d_4 = 5.7026$ | $n_3 = 1.62299$ | $\nu_3 = 58.16$ |
| $r_5 = 87.2528$ | | |
| $d_5 = D_1$ (variable) | | |
| $r_6 = 76.9405$ | | |
| $d_6 = 0.9$ | $n_4 = 1.72916$ | $\nu_4 = 54.68$ |
| $r_7 = 11.0085$ | | |
| $d_7 = 5.9957$ | | |
| $r_8 = -13.1448$ | | |
| $d_8 = 0.9$ | $n_5 = 1.6228$ | $\nu_5 = 57.05$ |
| $r_9 = 104.6624$ | | |
| $d_9 = 4.1602$ | $n_6 = 1.84666$ | $\nu_6 = 23.78$ |
| $r_{10} = -28.8454$ | | |
| $d_{10} = D_2$ (variable) | | |
| $r_{11} = 14.1865$ | | |
| $d_{11} = 3.1255$ | $n_7 = 1.51633$ | $\nu_7 = 64.14$ |
| $r_{12} = 11.3224$ | | |
| $d_{12} = 1.0000$ | | |
| $r_{13} = \infty$ (stop) | | |
| $d_{13} = D_3$ (variable) | | |
| $r_{14} = -99.9823$ | | |
| $d_{14} = 18.8281$ | $n_8$ (gradient index lens) | |
| $r_{15} = \infty$ | | |
| $d_{15} = D_4$ (variable) | | |
| $r_{16} = \infty$ | | |
| $d_{16} = 3.6832$ | $n_9 = 1.51633$ | $\nu_9 = 64.14$ |
| $r_{17} = \infty$ | | |

-continued

| | wide | intermediate focal length | tele |
|---|---|---|---|
| $D_1$ | 0.471 | 6.2415 | 13.2751 |
| $D_2$ | 16.1069 | 10.5011 | 4.8821 |
| $D_3$ | 2.5167 | 4.0507 | 1.7486 |
| $D_4$ | 5.8636 | 6.0204 | 6.7845 |

| | radial gradient index lens | |
|---|---|---|
| i | Ni | Vi |
| 0 | 1.664 | 38.2 |
| 1 | $-3.27 \times 10^{-3}$ | $6.55 \times 10^2$ |
| 2 | 0 | $6.55 \times 10^2$ |

$\phi = \phi_m/(\phi_s + \phi_m) = 1.0734967, \phi_m = 0.0964, \phi_s = -0.0066$
$\Delta n = -0.04, \Delta D/f_W = 0.3568976, N_2 \cdot ER^2/N_1 = 0$
$D/f_R$ (max) $= 0.3868976, f_R = 10.658$
$d/F_G = 1.7665697, F_G$ 10.658

Embodiment 7

$f = 6.57 \sim 15.0$ F/3.16, $2\omega = 45.6° \sim 17.9°$,
maximum image height $= 2.754, f_B = 6.06$

| | | |
|---|---|---|
| $r_1 = 142.4848$ | | |
| $d_1 = 1.2$ | $n_1 = 1.78472$ | $\nu_1 = 25.68$ |
| $r_2 = 40$ | | |
| $d_2 = 10$ | $n_2 = 1.60311$ | $\nu_2 = 60.64$ |
| $r_3 = -76.0459$ | | |
| $d_3 = 0.15$ | | |
| $r_4 = 30.1133$ | | |
| $d_4 = 5.866$ | $n_3 = 1.62299$ | $\nu_3 = 58.16$ |
| $r_5 = 90.4315$ | | |
| $d_5 = D_1$ (variable) | | |
| $r_6 = 20.2659$ | | |
| $d_6 = 0.9$ | $n_4 = 1.72916$ | $\nu_4 = 54.68$ |
| $r_7 = 9.2698$ | | |
| $d_7 = 5.9957$ | | |
| $r_8 = -11.957$ | | |
| $d_8 = 0.9$ | $n_5 = 1.6228$ | $\nu_5 = 57.05$ |
| $r_9 = 19.469$ | | |
| $d_9 = 4.4828$ | $n_6 = 1.84666$ | $\nu_6 = 23.78$ |
| $r_{10} = 72.0005$ | | |
| $d_{10} = D_2$ (variable) | | |
| $r_{11} = 68.554$ | | |
| $d_{11} = 3.8892$ | $n_7 = 1.51633$ | $\nu_7 = 64.14$ |
| $r_{12} = -269.34$ | | |
| $d_{12} = 1$ | | |
| $r_{13} = \infty$ (stop) | | |
| $d_{13} = D_3$ (variable) | | |
| $r_{14} = \infty$ | | |
| $d_{14} = 18.6065$ | $n_8 =$ (gradient index lens) | |
| $r_{15} = 67.8745$ | | |
| $d_{15} = D_4$ (variable) | | |
| $r_{16} = \infty$ | | |
| $d_{16} = 3.6832$ | $n_9 = 1.51633$ | $\nu_9 = 64.14$ |
| $r_{17} = \infty$ | | |

| | wide | intermediate focal length | tele |
|---|---|---|---|
| $D_1$ | 0.5553 | 5.6814 | 13.3457 |
| $D_2$ | 15.9521 | 10.9605 | 7.4379 |
| $D_3$ | 2.3579 | 5.6219 | 1.7486 |
| $D_4$ | 3.6317 | 3.8748 | 4.2822 |

| | radial gradient index lens | |
|---|---|---|
| i | Ni | Vi |
| 0 | 1.664 | 38.2 |
| 1 | $-3.27 \times 10^{-3}$ | $6.55 \times 10^2$ |
| 2 | 0 | $6.55 \times 10^2$ |

$\phi = \phi_m/\phi_s + \phi_m) = 1.113953, \phi_m = 0.0958m\ \phi_s = -0.0098$

-continued $\Delta n = -0.04$, $\Delta D/f_W = 0.589741$, $N_2 \cdot ER^2/N_1 = 0$
$D/f_R$ (max) = 0.51689, $f_R = 10.8764$
$d/F_G = 1.710722$, $F_G = 10.8764$ Embodiment 8

$f = 6.86 \sim 15.0$ F/2.64, $2\omega = 43.1° \sim 16.7°$,
maximum image height = 2.754, $f_B = 2.09$

| | | |
|---|---|---|
| $r_1 = 1.33.8893$ | | |
| $d_1 = 1.2$ | $n_1 = 1.78472$ | $\nu_1 = 25.68$ |
| $r_2 = 40$ | | |
| $d_2 = 10$ | $n_2 = 1.60311$ | $\nu_2 = 60.64$ |
| $r_3 = -80.0512$ | | |
| $d_3 = 0.15$ | | |
| $r_4 = 33.0048$ | | |
| $d_4 = 5.9105$ | $n_3 = 1.62299$ | $\nu_3$ 58.16 |
| $r_5 = 113.6187$ | | |
| $d_5 = D_1$ (variable) | | |
| $r_6 = 17.2927$ | | |
| $d_6 = 0.9$ | $n_4 = 1.72916$ | $\nu_4 = 54.68$ |
| $r_7 = 9.3763$ | | |
| $d_7 = 5.9957$ | | |
| $r_8 = -13.9796$ | | |
| $d_8 = 0.9$ | $n_5 = 1.6228$ | $\nu_5 = 57.05$ |
| $r_9 = 16.3628$ | | |
| $d_9 = 4.4692$ | $n_6 = 1.84666$ | $\nu_6 = 23.78$ |
| $r_{10} = -126.6084$ | | |
| $d_{10} = D_2$ (variable) | | |
| $r_{11} = \infty$ (stop) | | |
| $d_{11} = D_3$ (variable) | | |
| $r_{12} = 56.6143$ | | |
| $d_{12} = 18.6614$ | $n_7$ (gradient index lens) | |
| $r_{13} = \infty$ | | |
| $d_{13} = 0.6518$ | | |
| $r_{14} = 49.8489$ | | |
| $d_{14} = 3.3021$ | $n_8 = 1.51633$ | $\nu_8 = 64.14$ |
| $r_{15} = 12.744$ | | |
| $d_{15} = D_4$ (variable) | | |
| $r_{16} = \infty$ | | |
| $d_{16} = 1.6832$ | $n_9 = 1.51633$ | $\nu_9 = 64.14$ |
| $r_{17} = \infty$ | | |

| | wide | intermediate focal length | tele |
|---|---|---|---|
| $D_1$ | 0.5537 | 5.1431 | 13.6255 |
| $D_2$ | 20.773 | 15.6073 | 13.5928 |
| $D_3$ | 2.28 | 4.7825 | 1.7486 |
| $D_4$ | 0.9778 | 1.0835 | 1.2972 |

| | radial gradient index lens | |
|---|---|---|
| i | Ni | Vi |
| 0 | 1.664 | 38.2 |
| 1 | $-3.27 \times 10^{-3}$ | $6.55 \times 10^2$ |
| 2 | 0 | $6.55 \times 10^2$ |

$\phi = \phi_m/(\phi_s + \phi_m) = 0.891264$, $\phi_m = 0.0959$, $\phi_s = 0.0117$
$\Delta n = -0.04$, $\Delta D/f_W = 0.442347$, $N_2 \cdot ER^2/N_1 = 0$
$D/f_R$ (max) = 0.492138, $f_R = 9.7178$
$d/F_G = 1.875951$, $F_G = 9.9477$ wherein the reference symbols $r_1$, $r_2$, . . . represent radii of curvature on surfaces of respective lens elements, the reference symbols $d_1$, $d_2$, . . . designate thicknesses of the respective lens elements and airspaces reserved therebetween, the reference symbols $n_1$, $n_2$, . . . denote refractive indices of the respective lens elements, and the reference symbols $\nu_1$, $\nu_2$, . . . represent Abbe's numbers of the respective lens elements. Further, lengths such as the radii of curvature are expressed in a unit of millimeter and the d-line is taken as a standard wavelength.

Figure 1B:
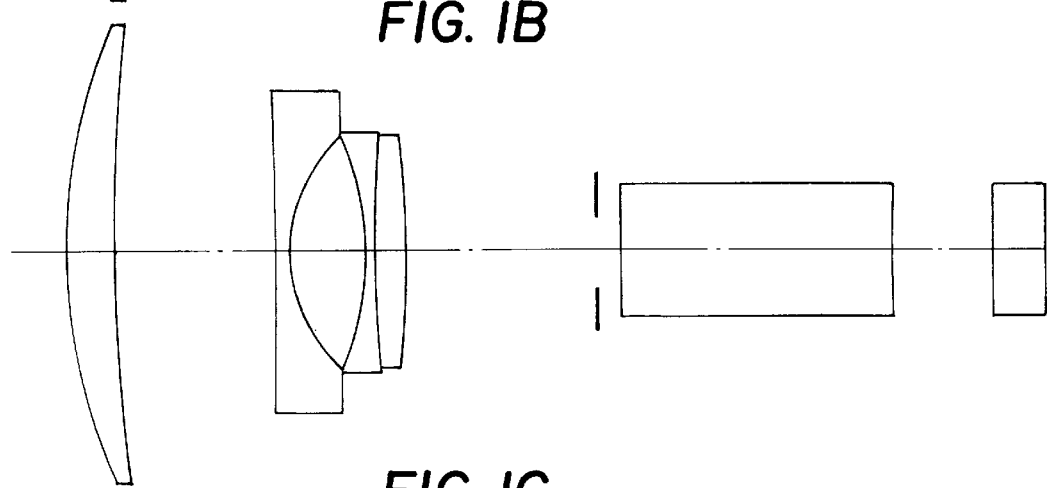
Figure 1C:
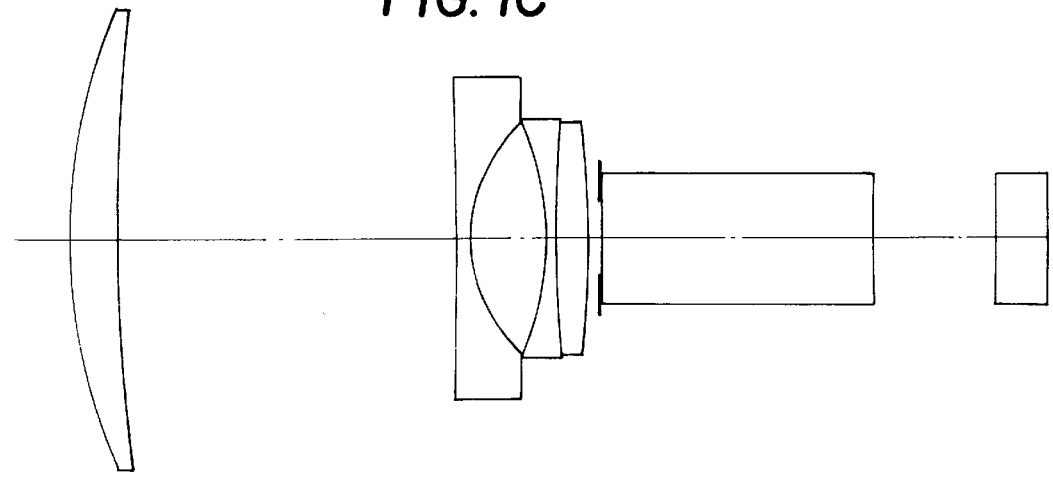

The first embodiment has a composition illustrated in FIGS. 1A–1C, or a vari-focal lens system which is composed of three lens units: in order from the object side, a first positive lens unit, a second negative lens unit and a third positive lens unit used as a final lens unit. The first lens unit is composed of a single positive aspherical meniscus lens element and the second lens unit is composed of three lens elements, or a negative meniscus lens element, a cemented lens component consisting of a negative lens element and a positive lens element. All the lens elements used to compose the first lens unit and the second lens unit are homogeneous lens elements. Further, the third lens unit is composed of a single radial type plano-concave gradient index lens element, i.e., a radial type gradient index lens element which has an object side planar surface and an image side surface having curvature.

As the vari-focal lens system preferred as the first embodiment is zoomed from a wide position to a tele position, the second lens unit and the third lens unit are moved so as to widen an airspace reserved between the first lens unit and the second lens unit, and narrow an airspace reserved between the second lens unit and the third lens unit while the first lens unit and an aperture stop are kept stationary. The third lens unit is moved so as to narrow an airspace ($D_3$) reserved between the third lens unit (the gradient index lens element) and the aperture stop.

Further, a plane parallel glass plate which is disposed on the image side of the lens system is to be assumed as a low pass filter, an infrared cut filter, a CCD protective glass plate and so on.

Figure 2A:
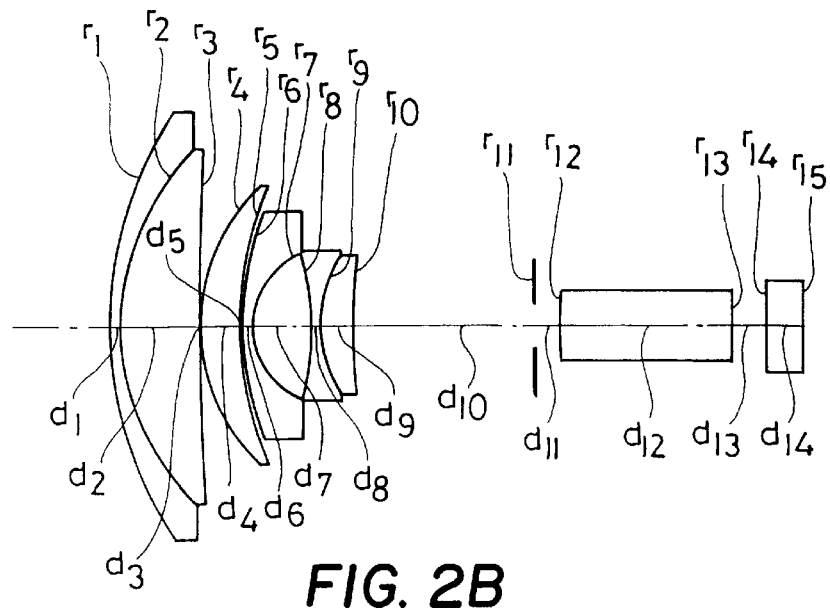
Figure 2B:
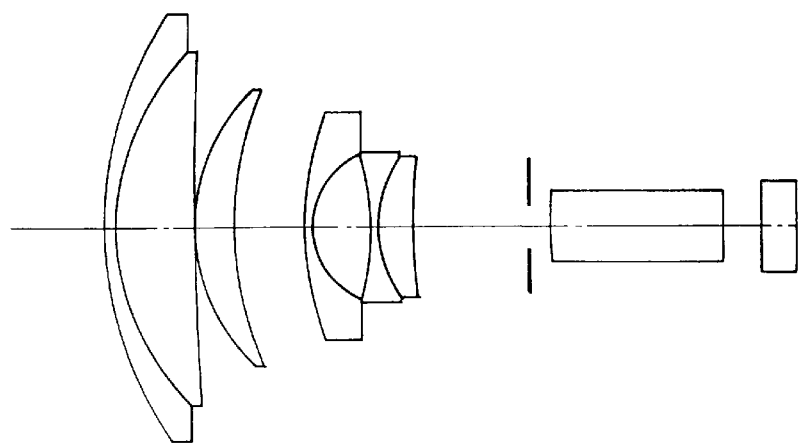
Figure 2C:
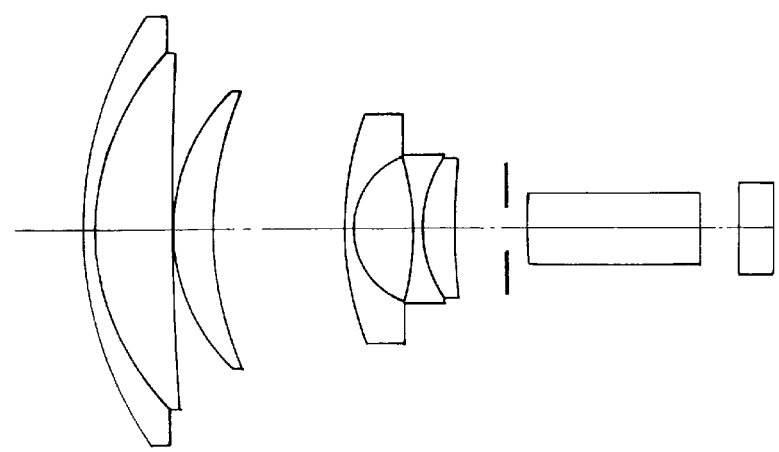
Figure 3A:
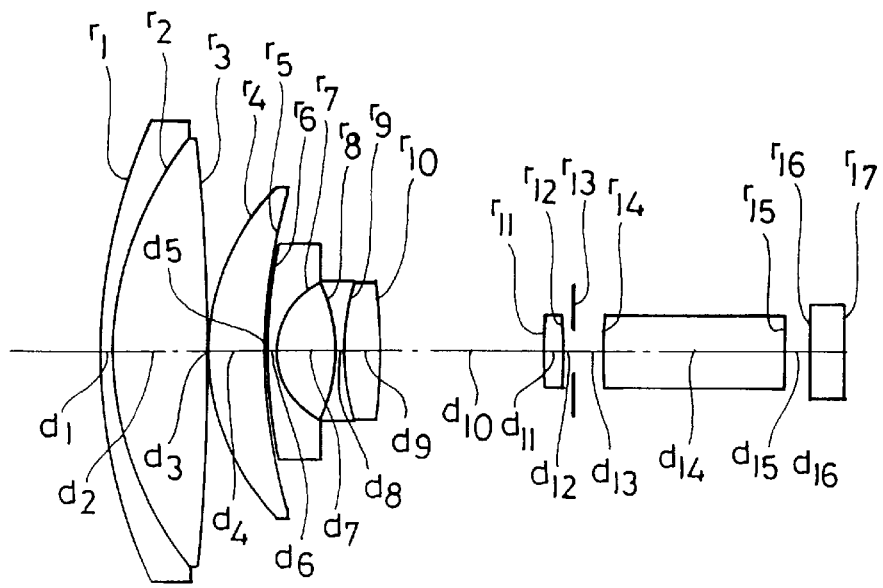
Figure 3B:
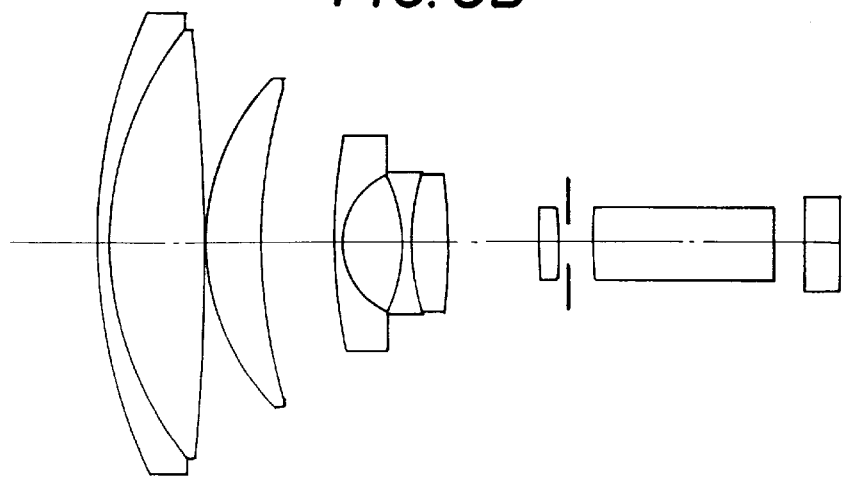
Figure 3C:
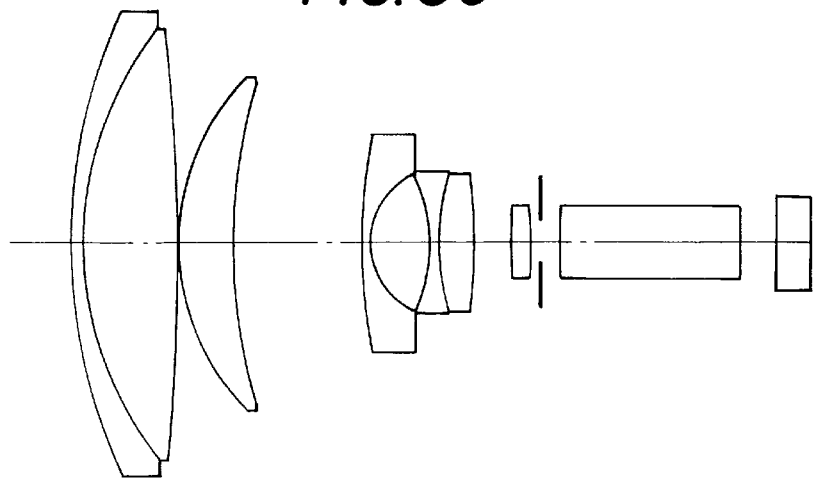

The second embodiment is a vari-focal lens system which is composed of three lens units: in order from the object side, a first positive lens unit, a second negative lens unit and a third positive lens unit disposed as a final lens unit as shown in FIGS. 2A–2C. The first lens unit is composed of three homogeneous lens elements, or a cemented lens component consisting of a negative meniscus lens element and a positive meniscus lens element, and a positive meniscus lens element, the second lens unit is composed of three homogeneous lens elements, or a negative meniscus lens element, and a cemented lens component consisting of a negative lens element and a positive meniscus lens element, and the third lens unit is composed of a single radial type convexo-planar gradient index lens element. Further, a plane parallel glass plate disposed on the image side of the lens system is to be assumed as a low pass filter, an infrared cut filter and a CCD protective glass plate.

For changing a magnification of the second embodiment from a wide position to a tele position, the second lens unit and the third lens unit are moved so as to widen an airspace reserved between the first lens unit and the second lens unit, and narrow an airspace reserved between the second lens unit and the third lens unit while the first lens unit and an aperture stop are kept stationary. The third lens unit is moved so as to narrow an airspace ($D_3$) reserved between the aperture stop and the third lens unit (gradient index lens element).

The third embodiment is a vari-focal lens system which is composed, in order from the object side, of a first positive lens unit, a second negative lens unit, a third positive lens unit and a fourth positive lens unit (final lens unit). The first lens unit is composed of three homogeneous lens elements, or a cemented lens component consisting of a negative meniscus lens element and a positive lens element, and a positive meniscus lens element, the second lens unit is composed of three homogeneous lens elements, or a negative meniscus lens element and a cemented lens component consisting of a negative lens element and a positive lens element, third lens unit is composed of a single positive homogeneous lens element, and the fourth lens unit is composed of a single radial type convexo-planar gradient index lens element. Further, a plane parallel glass plate is to be assumed as a low pass filter, an infrared cut filter, a CCD protective glass plate and so on.

For changing a magnification of the third embodiment from a wide position to a tele position, the second lens unit and the fourth lens unit are moved so as to widen an airspace reserved between the first lens unit and the second lens unit, and narrow an airspace reserved between the second lens unit and the third lens unit, and an airspace reserved between the third lens unit and the fourth lens unit while the first lens unit, the third lens unit and an aperture stop are kept stationary. Further, the fourth lens unit is moved so as to narrow an airspace ($D_3$) reserved between the aperture stop and the fourth lens unit (final lens unit).

Figure 4A:
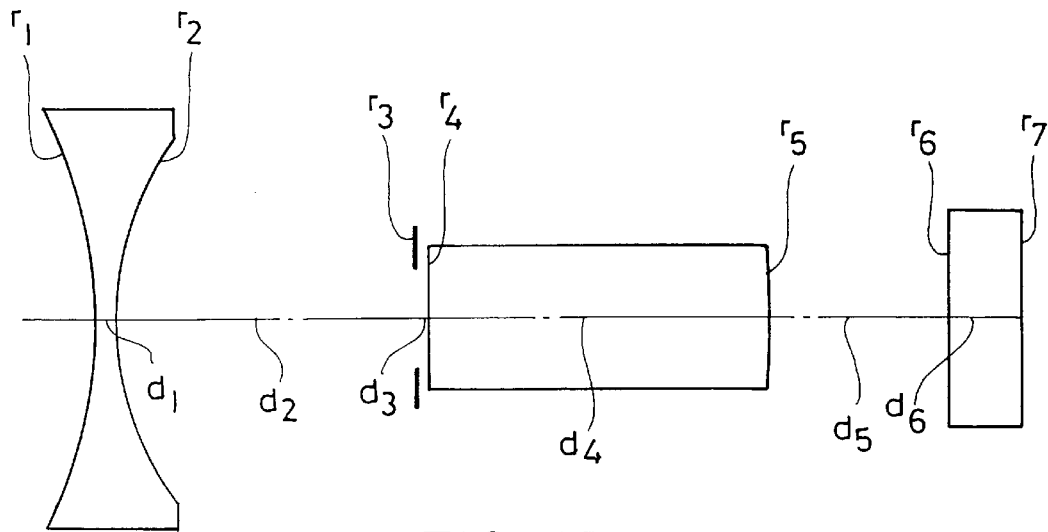
Figure 4B:
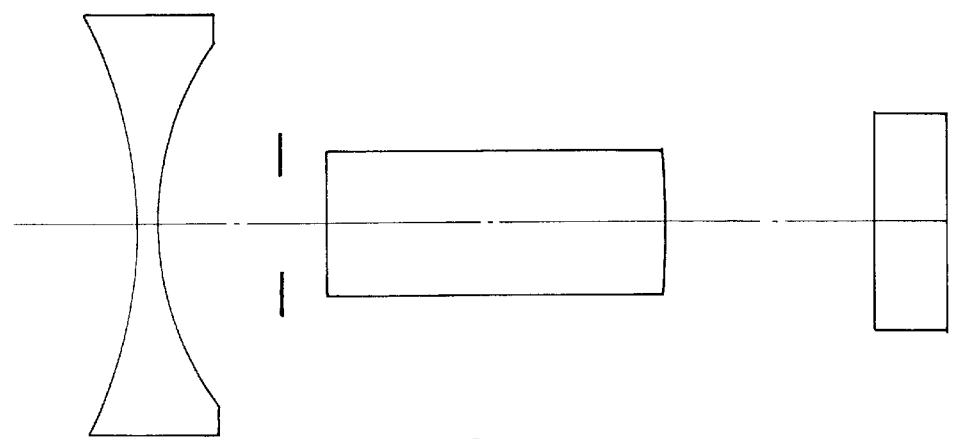
Figure 4C:
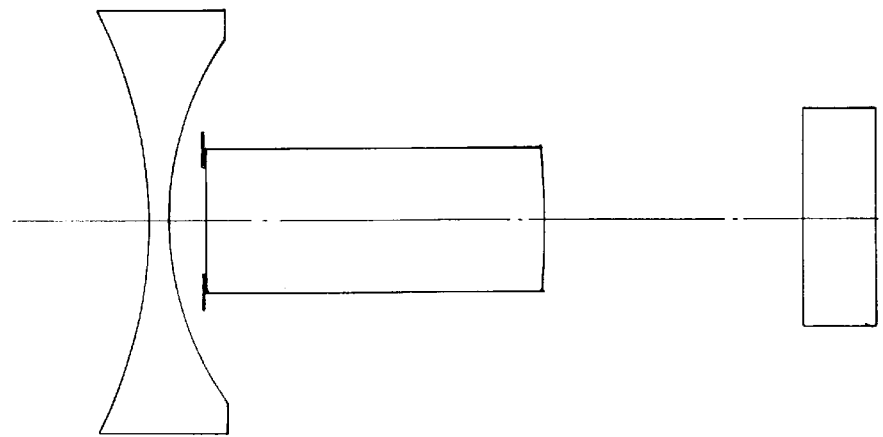

The fourth embodiment is a lens system that has a composition illustrated in FIGS. 4A–4C. Speaking concretely, the fourth embodiment is composed of two lens units: in order from the object side, a first negative lens unit and a second positive lens unit (final lens unit). The first lens unit is composed of a single negative homogeneous lens element and the second lens unit is composed of a single radial type plano-convex gradient index lens element. As the fourth embodiment is zoomed from a wide position to a tele position, the first lens unit and the second lens unit are moved so as to narrow an airspace reserved between the two lens units. In the fourth embodiment, all of the first lens unit, an aperture stop and the second lens unit are moved so as to vary an airspace ($D_2$) reserved between the aperture stop and the second lens unit as shown in the drawing.

Further, a plane parallel glass plate disposed on the image side of the lens system is to be assumed similarly as a low pass filter, an infrared cut filter, a CCD protective glass plate and so on.

Figure 5A:
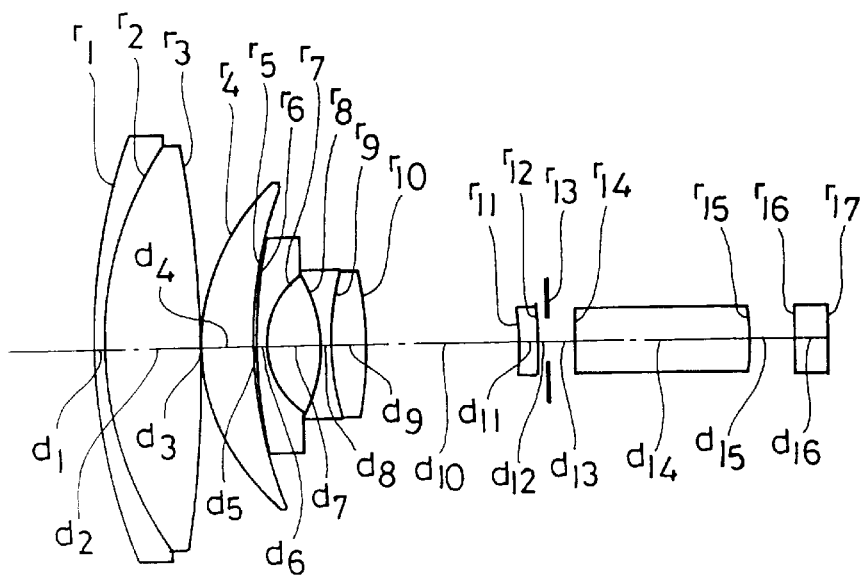
Figure 5B:
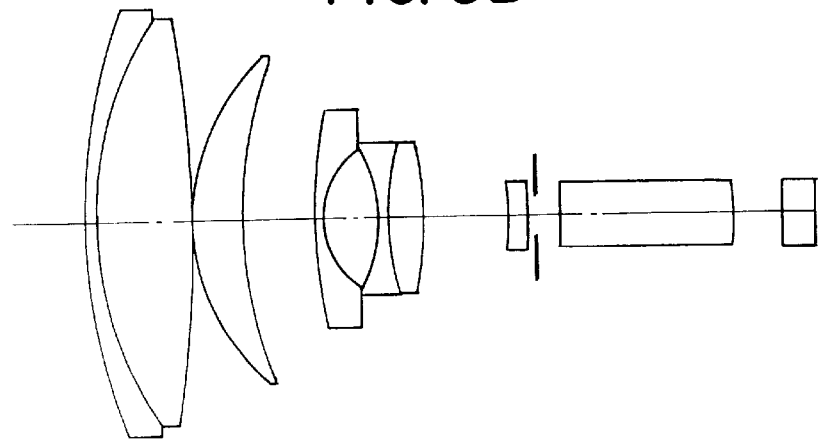
Figure 5C:
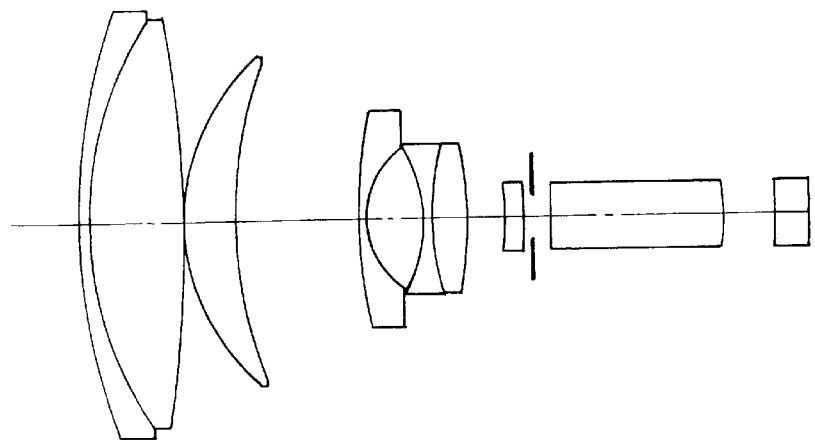

The fifth embodiment is a lens system which has a composition illustrated in FIGS. 5A–5C, or a vari-focal lens system which is composed of four lens units: in order from the object side, a first positive lens unit, a second negative lens unit, a third positive lens unit and a fourth positive lens unit (final lens unit). The first lens unit is composed of three homogeneous lens elements, or a cemented lens component consisting of a negative meniscus lens and a positive lens element, and a positive meniscus lens element, the second lens unit is composed of three homogeneous lens elements, or a negative meniscus lens element, and a cemented lens component consisting of a negative lens element and a positive lens element, the third lens unit is composed of a single negative homogeneous meniscus lens element, and the fourth lens unit is composed of a single radial type gradient index plano-convex lens element. A plane parallel glass plate disposed on the image side of the lens system is to be assumed similarly as a low pass filter, an infrared cut filter, a CCD protective glass plate and so on.

For changing a magnification of the fifth embodiment from a wide position to a tele position, the second lens unit and the fourth lens unit are moved so as to widen an airspace reserve between the first lens unit and the second lens unit, and shorten a distance as measured from the second lens unit to the fourth lens unit while the first lens unit is kept stationary. The fourth lens unit is moved so as to narrow an airspace ($D_3$) reserved between an aperture stop and the fourth lens unit (final lens unit).

Figure 6A:
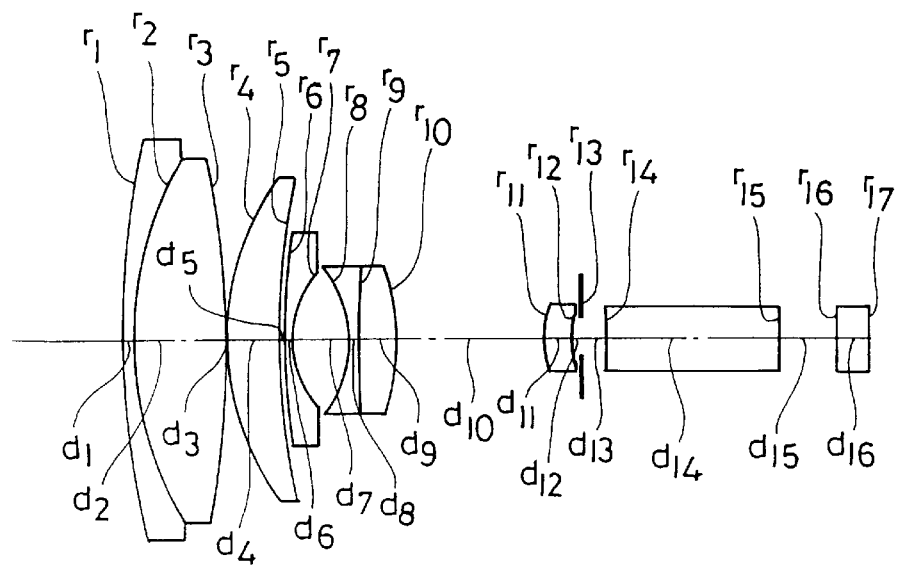
Figure 6B:
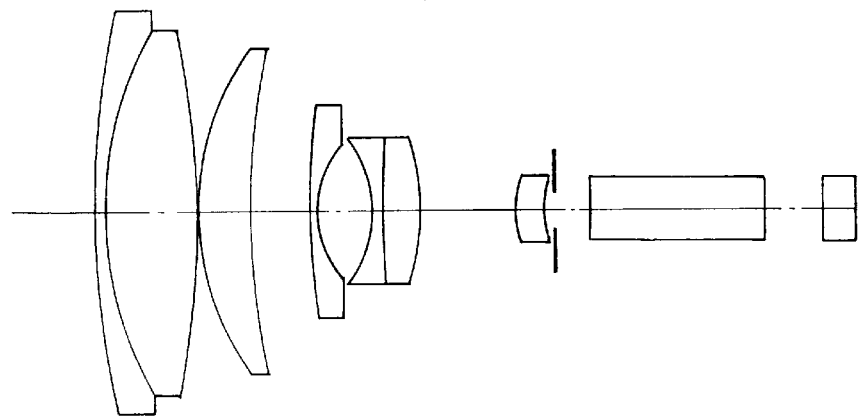
Figure 6C:
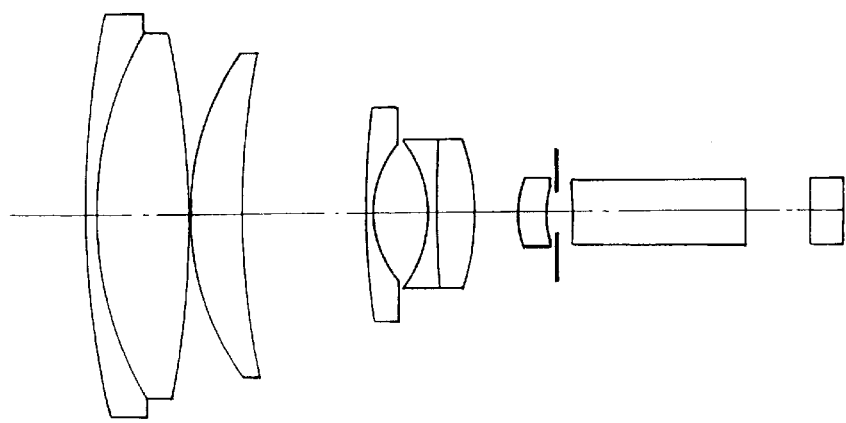

The sixth embodiment is a vari-focal lens system which has a composition illustrated in FIGS. 6A–6C, or is a vari-focal lens system which is composed, in order from the object side, of a first positive lens unit, a second negative lens unit, a third negative lens unit and a fourth positive lens unit (final lens unit). The first lens unit is composed of three homogeneous lens elements, or a cemented lens component consisting of a negative meniscus lens element and a positive lens element, and a positive meniscus lens element, the second lens unit is composed of three homogeneous lens elements, or a negative meniscus lens element, and a cemented lens component consisting of a negative lens element and a positive lens element, the third lens unit is composed of a single negative meniscus lens element, and the fourth lens unit is composed of a single gradient index concave-planar lens element. A plane parallel glass plate disposed on the image side of the lens system is to be assumed similarly as a low pass filter, an infrared cut filter, a CCD protective glass plate and so on.

As the sixth embodiment is zoomed from a wide position to a tele position, the second lens unit, the third lens unit and the fourth lens unit are moved so as to widen an airspace reserved between the first lens unit and the second lens unit, and shorten a distance as measured from the second lens unit to the fourth lens unit while the first lens unit is kept stationary. Further, an airspace ($D_3$) reserved between an aperture stop and the fourth lens unit (gradient index lens element) is varied as shown in FIGS. 6A–6C.

Figure 7A:
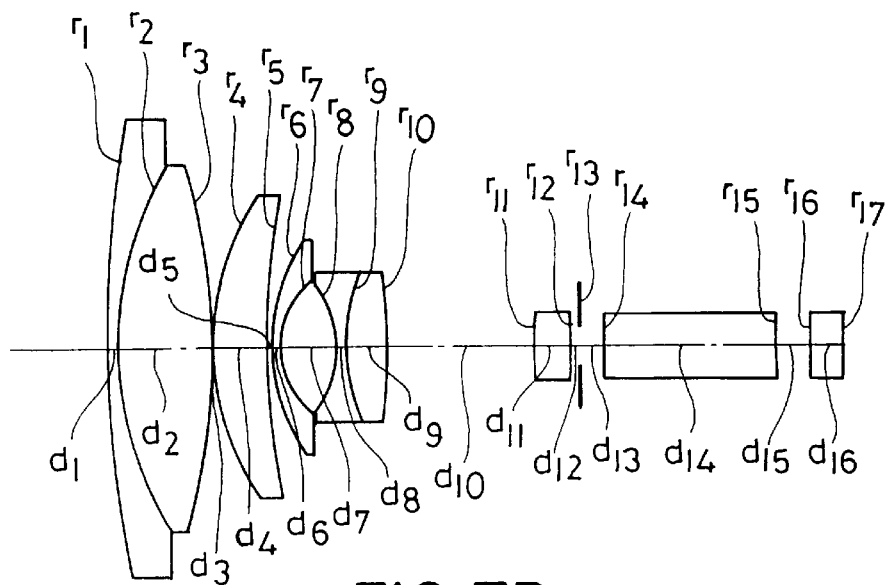
Figure 7B:
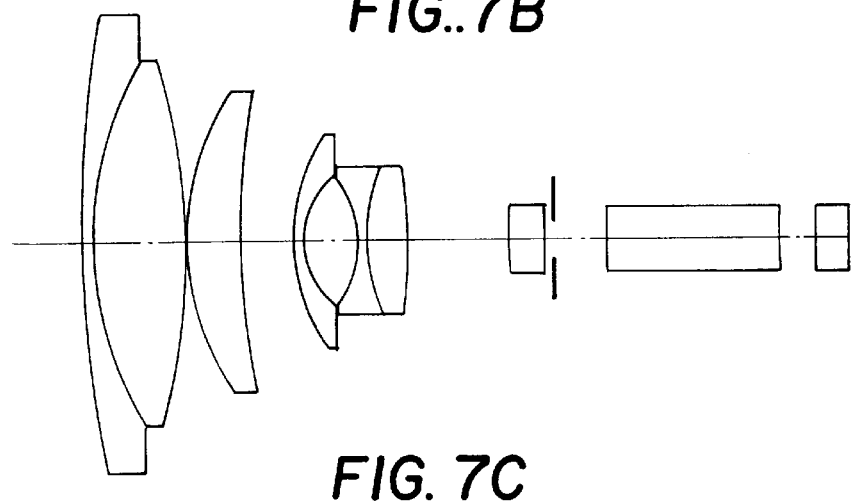
Figure 7C:
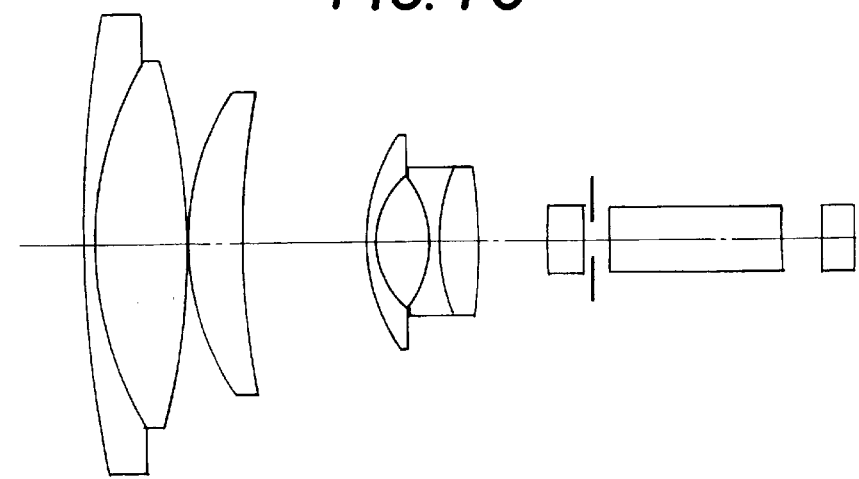

The seventh embodiment is a lens system which has a composition illustrated in FIGS. 7A–7C. Speaking concretely, the seventh embodiment is a vari-focal lens system which is composed of four lens units: in order from the object side, a first positive lens unit, a second negative lens unit, a third positive lens unit and a fourth positive lens unit (final lens unit). The first lens unit is composed of three homogeneous lens elements, or a cemented lens component consisting of a negative meniscus lens element and a positive lens element, and a positive meniscus lens element, the second lens unit is composed of three homogeneous lens elements, or a negative meniscus lens element, and a cemented lens component consisting of a negative lens element and a positive lens element, the third lens unit is composed of a single homogeneous biconvex lens element, and the fourth lens unit is composed of a single radial type gradient index plano-concave lens element. Further, a plane parallel glass plate disposed on the image side of the lens system is to be assumed similarly as a low pass filter, an infrared cut filter, a CCD protective glass plate and so on.

For changing a magnification of the lens system preferred as the seventh embodiment from a wide position to a tele position, the second lens unit, the third lens unit and the fourth lens unit are moved so as to widen an airspace reserved between the first lens unit and the second lens unit, and shorten a distance as measured from the second lens unit to the fourth lens unit while the first lens unit is kept stationary during the change of the magnification. Further, an airspace ($D_3$) reserved between an aperture stop and the fourth lens unit (gradient index lens element) is varied during the change of the magnification as shown in FIGS. 7A–7C.

Figure 8A:
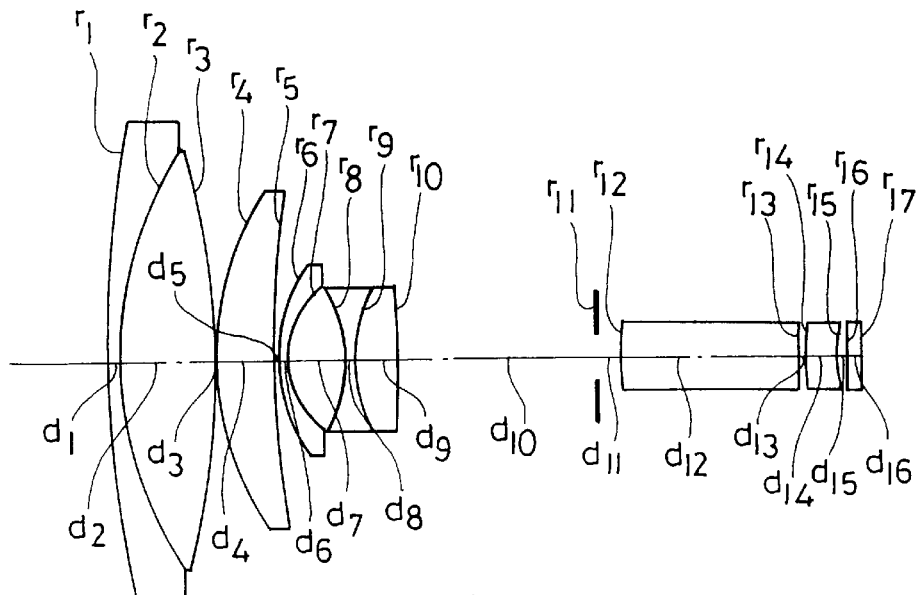
Figure 8B:
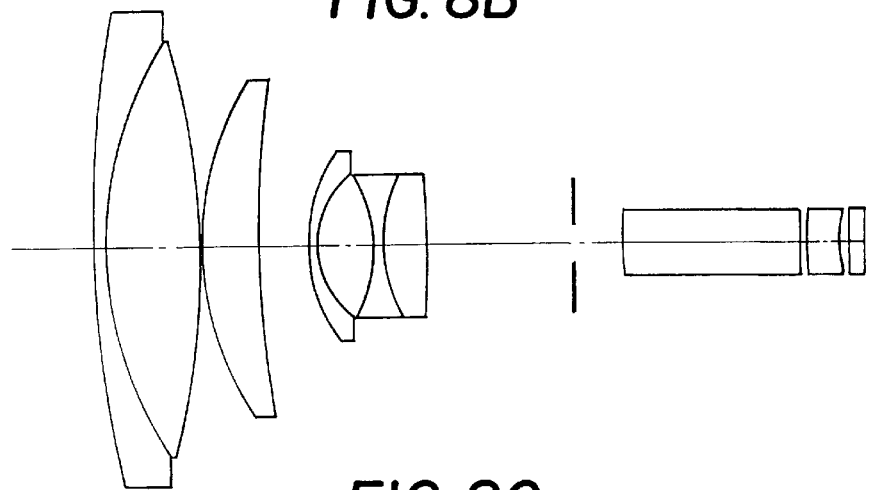
Figure 8C:
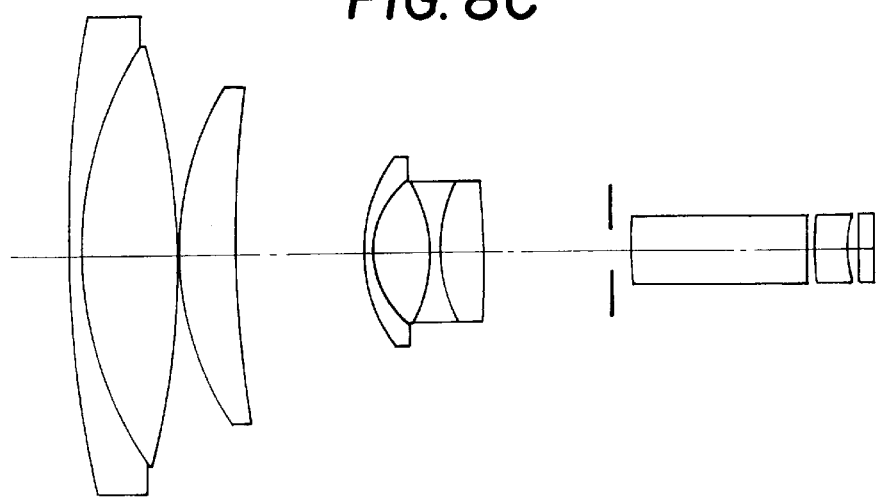

The eighth embodiment is a lens system which has a composition illustrated in FIGS. 8A–8C. Speaking concretely, the eighth embodiment is a vari-focal lens system which is composed of three lens units: in order from the object side, a first positive lens unit, a second negative lens unit and a third positive lens unit (final lens unit). The first lens unit is composed of three homogeneous lens elements, or a cemented lens component consisting of a negative meniscus lens element and a positive lens element, and a positive meniscus lens element, the second lens unit is composed of three homogeneous lens element, or a negative meniscus lens element, and a cemented lens component consisting of a negative lens element and a positive lens element, and the third lens unit is composed of two homogenious lens elements, or a gradient index convexo-planar lens element and a negative meniscus homogenious lens element. As in the other embodiments, a plane parallel glass plate disposed on the image side of the lens system is to be assumed as a low pass filter, an infrared cut filter, a CCD protective glass plate and so on.

For changing a magnification of the eighth embodiment from a wide position to a tele position, the second lens unit and the third lens unit are moved so as to widen an airspace reserved between the first lens unit and the second lens unit, and narrow an airspace reserved between the second lens unit and the third lens unit while the first lens unit is kept stationary during the change of the magnification. Further, an aperture stop is disposed on the object side of the third lens unit (the gradient index lens element), and an airspace ($D_3$) reserved between the aperture stop and the third lens unit is varied during the change of the magnification as shown in FIGS. 8A–8C.

Out of the embodiments described above, the second, third and fifth through eighth embodiments use final lens units which comprise radial type gradient index lens elements which are the same in an outside diameter and a shape of refractive index distribution. Accordingly, these embodiments have a merit to permit shortening a period of time required for development in addition to a merit to permit lowering manufacturing costs thereof. Speaking from a viewpoint of common use of a material, it is desirable to configure a gradient index lens element so as to have curvature, thereby enlarging freedom for lens design and facilitating common use of the lens element.

In FIGS. 1A through 8C, the figure labels (A), (B) and (C) indicate conditions of the lens systems which are set at wide positions, intermediate focal lengths and tele positions respectively.

The aspherical surface used in the first embodiment is expressed by the following equation:

$$x=(y^2/R)/[1+\{1-p(y/r)^2\}^{1/2}]+By^2+Ey^4+Fy^6+Gy^8+Hy^{10}$$

wherein the reference symbol R represents a radius of curvature at a vertex of the aspherical surface, the reference symbol p designates a conical constant, and the reference symbols B, E, F, . . . denote aspherical surface coefficients.

The vari-focal lens system according to the present invention is suited for use also in electronic image pickup optical systems such as digital cameras, composed of a reduced number of lens elements owing to a gradient index lens element disposed in a final lens unit, reduces production of rays reflected by surfaces, ghost rays and flare spots which are peculiar to vari-focal lens systems, facilitates working and assembly, etc. of the lens system and a lens barrel, can be manufactured at a low cost, and has favorable optical performance to correct aberrations such as astigmatism favorably.

I claim:

1. A vari-focal lens system comprising a plurality of lens units, wherein a final lens unit has a positive refractive power, wherein said lens system comprises at least a gradient index lens element which has a planar surface and another surface having curvature and at least one lens unit provided on an object side from said final lens unit, and wherein the magnification of said lens system is changed by varying a space between said final lens unit and a lens unit closest to object side of said final lens unit.

2. A vari-focal lens system comprising a plurality of lens units, wherein a final lens unit comprises at least a gradient index lens element, wherein an aperture stop is disposed on the object side of said final lens unit, wherein an airspace reserved between said aperture stop and said final lens unit is varied for changing a magnification of said lens system, and wherein said vari-focal lens system satisfies the following condition (7):

$$|\Delta D/f_w|<0.8$$

wherein the reference symbol $\Delta D$ represents a maximum variation of the airspace reserved between said aperture stop and said final lens unit, and the reference symbol $f_w$ designates a focal length of said lens system as a whole at a wide position thereof.

3. A vari-focal lens system according to claim 1 or 2, wherein said final lens unit consists of a radial type gradient index lens element.

4. A vari-focal lens system according to claim 3, wherein said final lens unit has a positive refractive power.

5. A vari-focal lens system according to claim 1 or 2, comprising a first lens unit having a positive refractive power, a second lens unit having a negative refractive power and a third lens unit having a positive refractive power.

6. A vari-focal lens system according to claim 1 or 2, comprising a first lens unit having a positive refractive power, a second lens unit having a negative refractive power, a third lens unit having a positive or negative refractive power and a fourth lens unit having a positive refractive power.

7. A vari-focal lens system according to claim 1 or 2, comprising a first lens unit having a negative refractive power and a second lens unit having a positive refractive power.

8. A vari-focal lens system according to claim 5, wherein said first lens unit consists of a single lens element.

9. A vari-focal lens system according to claim 6, wherein said first lens unit consists of a single lens element.

10. A vari-focal lens system according to claim 7, wherein said first lens unit consists of a single lens element.

11. A vari-focal lens system according to claim 5, wherein said second lens unit consists of three lens elements.

12. A vari-focal lens system according to claim 6, wherein said second lens unit consists of three lens elements.

13. A vari-focal lens system according to claim 1 or 2, wherein said first lens unit consists of a single lens element, said second lens unit consists of three lens elements and said third lens unit consists of a single lens element.

14. A vari-focal lens system according to claim 2, wherein a surface of said gradient index lens element has curvature.

15. A vari-focal lens system according to claim 1 or 2, satisfying the following condition (6):

$$0.01<\Delta n<0.2 \tag{6}$$

wherein the reference symbol In represents a maximum refractive index difference of said radial type gradient index lens element.

16. A vari-focal lens system according to claim 1 or 2, satisfying the following condition (1):

$$0.5<a<2 \tag{1}$$

wherein the reference symbol a represents a ratio of a refractive power of medium of said radial type gradient index lens element.

17. A vari-focal lens system according to claim 16 satisfying, in place of the condition (1), the following condition (1-1):

$$0.5 < a < 0.97. \tag{1-1}$$

18. A vari-focal lens system according to claim 17 satisfying, in place of the condition (1-1), the following condition (1-2):

$$0.5 < a < 0.95. \tag{1-2}$$

19. A vari-focal lens system according to claim 16 satisfying, in place of the condition (1), the following condition (1-3):

$$1.03 < a < 2. \tag{1-3}$$

20. A vari-focal lens system according to claim 19 satisfying, in place of the condition (1-3), the following condition (1-4):

$$1.05 < a < 2. \tag{1-4}$$

21. A vari-focal lens system according to claim 1 or 2, satisfying the following condition (2):

$$0.05 < d/f_G < 5 \tag{5}$$

wherein the reference symbol d represents a thickness of said radial type gradient index lens element and the reference symbol $f_G$ designates a focal length of said radial type gradient index lens element.

22. A vari-focal lens system according to claim 1 or 2, satisfying the following conditions (3) and (4):

$$-0.2 < N_2 \cdot ER^2/N_1 < 2.0 \tag{3}$$

$$V_0 < V_1 \tag{4}$$

wherein the reference symbols $N_1$ and $N_2$ represent distribution coefficients of the second and fourth orders respectively of the radial type gradient index lens element, the reference symbol ER designates an effective diameter of the radial type gradient index lens element, and the reference symbols $V_1$ and $V_2$ denote Abbe's numbers of the radial type gradient index lens element.

23. A vari-focal lens system according to claim 22, satisfying the following conditions (3-1) and (8):

$$-0.05 < N_2 \cdot ER^2/N_1 < 0.05 \tag{3-1}$$

$$-0.01 < 1/V_1 < 0.02$$

wherein the reference symbols $N_1$ and $N_2$ represent distribution coefficients of the second and fourth orders respectively, the reference symbol ER designates an effective diameter of the radial type gradient index lens element, and the reference symbol $V_1$ denotes an Abbe's number of the radial type gradient index lens element.

24. A vari-focal lens system comprising a plurality of lens units, wherein a final lens unit has a positive refractive power, wherein said lens system comprises at least a gradient index lens element which has a planar surface and another surface having curvature, and wherein said final lens unit consists of a radial type gradient index lens element.

25. A vari-focal lens system comprising a first lens unit having a positive refractive power; a second lens unit having a negative refractive power; a third lens unit having a positive or negative refractive power; and a fourth lens unit having a positive refractive power, wherein a final lens unit has a positive refractive power, and wherein said lens system comprises at least a gradient index lens element which has a planar surface and another surface having curvature.

26. A vari-focal lens system according to claim 25, wherein said first lens unit consists of a single lens element.

27. A vari-focal lens system according to claim 25, wherein said second lens unit consists of three lens elements.

28. A vari-focal lens system comprising a plurality of lens units, wherein a final lens unit has a positive refractive power, wherein said lens system comprises at least a gradient index lens element which has a planar surface and another surface having curvature, and wherein said first lens unit consists of a single lens element, said second lens unit consists of three lens elements and said third lens unit consists of a single lens element.

29. A vari-focal lens system comprising a plurality of lens units, wherein a final lens unit has a positive refractive power, and wherein said lens system comprises at least a gradient index lens element which has a planar surface and another surface having curvature, and said vari-focal lens system satisfies the following condition (6):

$$0.01 < \Delta n < 0.2 \tag{6}$$

wherein the reference symbol $\Delta n$ represents a maximum refractive index difference of said radial type gradient index lens element.

30. A vari-focal lens system comprising a plurality of lens units, wherein a final lens unit has a positive refractive power, and wherein said lens system comprises at least a gradient index lens element which has a planar surface and another surface having curvature, and said vari-focal lens system satisfies the following condition (1):

$$0.5 < a < 2 \tag{1}$$

wherein the reference symbol a represents a ratio of a refractive power of medium of said radial type gradient index lens element.

31. A vari-focal lens system according to claim 30, satisfying, in place of the condition (1), the following condition (1 - 1):

$$0.5 < a < 0.97. \tag{1-1}$$

32. A vari-focal lens system according to claim 31, satisfying, in place of the condition (1-1), the following condition (1-2):

$$0.5 < a < 0.95. \tag{1-2}$$

33. A vari-focal lens system according to claim 30 satisfying, in place of the condition (1), the following condition (1-3):

$$1.03 < a < 2. \tag{1-3}$$

34. A vari-focal lens system according to claim 33, satisfying, in place of the condition (1-3), the following condition (1-4):

$$1.05 < a < 2. \quad (1\text{-}4)$$

35. A vari-focal lens system comprising a plurality of lens units, wherein a final lens unit has a positive refractive power, and wherein said lens system comprises at least a gradient index lens element which has a planar surface and another surface having curvature, and said vari-focal lens system satisfies the following condition (2):

$$0.05 < d/f_G < 5 \quad (2)$$

wherein the reference symbol d represents a thickness of said radial type gradient index lens element and the reference symbol $f_G$ designates a focal length of said radial type gradient index lens element.

36. A vari-focal lens system comprising a plurality of lens units, wherein a final lens unit has a positive refractive power, and wherein said lens system comprises at least a gradient index lens element which has a planar surface and another surface having curvature, and said vari-focal lens system satisfies the following conditions (3) and (4):

$$-0.2 < N_2 \cdot ER^2/N_1 < 2.0 \quad (3)$$

$$V_0 < V_1 \quad (4)$$

wherein the reference symbols $N_1$ and $N_2$ represent distribution coefficients of the second and fourth orders respectively of the radial type gradient index lens element, the reference symbol ER designates an effective diameter of the radial type gradient index lens element, and the reference symbols $V_1$ and $V_2$ denote Abbe's numbers of the radial type gradient index lens element.

37. A vari-focal lens system according to claim 36, satisfying the following conditions (3-1) and (8):

$$-0.05 < N_2 \cdot ER^2/N_1 < 0.05 \quad (3\text{-}1)$$

$$-0.01 < 1/V_1 < 0.02 \quad (8)$$

wherein the reference symbols $N_1$ and $N_2$ represent distribution coefficients of the second and fourth orders respectively, the reference symbol ER designates an effective diameter of the radial type gradient index lens element, and the reference symbol $V_1$ denotes an Abbe's number of the radial type gradient index lens element.

* * * * *